United States Patent
Gibson et al.

(10) Patent No.: US 6,680,943 B1
(45) Date of Patent: Jan. 20, 2004

(54) ESTABLISHING BI-DIRECTIONAL COMMUNICATION SESSIONS ACROSS A COMMUNICATIONS NETWORK

(75) Inventors: Mark Robert Gibson, Herts (GB); David Stacey, Starstead (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/410,317

(22) Filed: Oct. 1, 1999

(51) Int. Cl.[7] .............................................. H04L 12/28
(52) U.S. Cl. ............. 370/392; 370/395.52; 370/395.21; 370/400
(58) Field of Search .............................. 370/238, 238.1, 370/352, 389, 392, 393, 395.21, 395.3, 395.31, 395.5, 395.52, 400, 401, 410, 469

(56) References Cited

U.S. PATENT DOCUMENTS

| | | | | |
|---|---|---|---|---|
| 5,991,301 | A | * 11/1999 | Christie | 370/395.3 |
| 6,363,319 | B1 | * 3/2002 | Hsu | 701/202 |
| 6,408,001 | B1 | * 6/2002 | Chuah et al. | 370/392 |
| 6,466,985 | B1 | * 10/2002 | Goyal et al. | 709/238 |

OTHER PUBLICATIONS

Trillium Multiprotocol Label Switching, Web ProForum Tutorials.*
IETF Multiprotocol Label Switching (MPLS) Architecture, Le Faucheur, Francois, Jun. 24, 1998, IEEE.*
Tag Switching Architecture Overview, Rekhter, Yakov; Davie, Bruce, 1997, IEEE.*
MPLS and Next Generation Access Networks, Kankkunen, Antti, 2000, IEEE.*
Adiseshu H et al: "a State Management Protocol for IntServ, DiffServ and Label Switching" Network Protocols, 1998. Proceedings. Sixth International Conference on Austin, TX, USA, Oct. 13–16, 1998, pp. 272–281.
Awduche D et al: "Requirements for Traffic Engineering Over MPLS (RFC 2702)" Request for Comment, Sep. 1999.
Awduche D O et al: "Extensions to RSVP for LSP Tunnels" Internet Draft, Sep. 1999.

* cited by examiner

*Primary Examiner*—Seema S. Rao
*Assistant Examiner*—Melanie Jagannathan
(74) *Attorney, Agent, or Firm*—Barnes & Thornburg

(57) ABSTRACT

On receipt of a request for a communication session over a communications network, such as an Internet Protocol communications network, a path for the session is established. In a preferred example the communications network is an MPLS network and the method uses a modified version of the SIP messaging protocol. Bandwidth along a chosen path is reserved and a messaging protocol such as CR-LDP used to establish this reserved path for the communication session. Internet protocol and MPLS communications networks typically only support uni-directional flows. Several methods for establishing bi-directional communication sessions over internet protocol communications networks that use MPLS connections are described. This is particularly useful for telephony applications using internet protocol communications networks. In a preferred example, the established connection provides a guaranteed level of quality of service.

35 Claims, 16 Drawing Sheets

ESTABLISHING BI-DIRECTIONAL COMMUNICATION SESSIONS ACROSS A COMMUNICATIONS NETWORK

BACKGROUND OF THE INVENTION

1. Field of the Invention

This invention relates to a method of establishing a bi-directional communication session between two endpoints in a communications network, and in particular but not limited to, situations where it is required to provide a guaranteed quality of service for the connection. The invention also relates to a communications network within which this method is implemented and also to a computer program for controlling a communications network in order to implement the method.

2. Description of the Prior Art

One factor that must be taken into account during design of communications systems is that of the time taken to establish a communication session. This should be as short as possible in order that customers are not deterred from using the communications service and for applications in which communication sessions must be established without delay.

The time taken to establish a communication session is a particular issue when providing a guaranteed quality of service for transmission of internet protocol traffic. Quality of service is an important factor; customers require a good quality of service for message transmission especially for real-time applications such as video conferencing and voice. As well as this many customers require a particular level of quality of service to be guaranteed; if quality of service drops below a certain level and transmission is interrupted or noisy this may be acceptable in some situations but unacceptable in others. If particular levels of quality of service can be guaranteed this is particularly advantageous. A number of approaches to provision of guaranteed quality of service for transmission of internet protocol traffic are now described and the time taken to establish such connections discussed.

One approach that has been used is to prioritise individual transmissions that are sent over the network. For example, a system known as "DiffServ" allows messages to be marked to indicate their priority. Nodes in a communications network are then arranged to process high priority messages first. This enables high priority messages to be processed quickly but it does not provide a guaranteed level of quality of service. Also a certain amount of processing time is necessarily taken up in determining the highest priority message at a given node and this can lead to increases in the time taken to set up a communications session.

Another approach has been to reserve bandwidth over a particular route in a communications network. However, systems that use this approach (for example RSVP Resource reSerVation Protocol) typically are poor at implementing aggregation mechanisms—for example they cannot easily combine a number of separate sessions over the same route, each must have its own reservation. Another shortcoming is that they also typically only allow the called party to reserve bandwidth that is required to host a communication session. This does not allow the calling party to specify their requirements and this is problematic, especially because the calling party is typically the party which incurs costs for a call. Also, the time taken to set up reservations is often significant and can introduce delays in the time taken to establish a communications session.

Multi Protocol Label Switching (MPLS) is a standard messaging protocol that is suitable for carrying Internet Protocol traffic over communications networks such as Asynchronous Transfer Mode (ATM) networks and Frame Relay networks.

Constraint-based Routing Label Distribution Protocol (CR-LDP) is also a standard messaging protocol (CR-LDP is defined in Internet Draft: draft-ietf-mpls-cr-ldp-01.txt) that is suitable for use with communications networks that use MPLS. Mechanisms such as CR-LDP allow MPLS the ability to set-up paths between two endpoints over a list of routers, where these paths have ATM-like traffic requirements. However, there is no well-defined mechanism for the choice of the routers in this path that makes full use of the ATM-like traffic parameters. The only existing mechanism (QOSPF Quality of Service Open Shortest Path First) allows routing only in terms of advertised router speed and congestion. In tandem, QOSPF is unable to make the fullest use of CR-LDP as it cannot make use of the detailed traffic descriptions used in CR-LDP; neither can it provide detailed route information. As well as this QOSPF is not able to ensure a connection over a suggested route.

Another problem involves setting up bi-directional communications sessions over a communications network such as an internet protocol communications network. Telephone networks such as public switched telephone networks provide dedicated connections between a calling party and a called party that are bi-directional, with equal bandwidth and guaranteed quality of service for both parties. However, internet protocol and data communications networks typically do not provide dedicated connections that are bi-directional in this way. This presents a problem for situations in which telephony type applications are required using data and internet protocol communications networks. For example, internet protocol communications networks such as MPLS communications networks typically only support uni-directional flows. When establishing a connection between two terminals over such a communications network, it is therefore necessary to setup separate forward and backward paths between those two terminals.

It is accordingly an object of the present invention to provide a method of establishing a bi-directional communication session between two endpoints in a communications network, which overcomes or at least mitigates one or more of the problems noted above.

SUMMARY OF THE INVENTION

Further benefits and advantages of the invention will become apparent from a consideration of the following detailed description given with reference to the accompanying drawings, which specify and show preferred embodiments of the invention.

According to a first aspect of the present invention there is provided a method of establishing a bi-directional communication session between a first endpoint and a second endpoint in a communications network, said method comprising the steps of:

(i) sending a communication from said second endpoint to said first endpoint to determine a path between said second and said first endpoints;

(ii) sending a first message along said path in order to set up a first label mapping along said path, for use over said path in a forward direction; and (iii) sending a second message along said path in order to set up a second label mapping along said path, for use over said path in a reverse direction.

A corresponding communications network is provided comprising at least two endpoints between which it is desired to establish a bi-directional communication session, said communications network comprising:

(i) a determiner arranged to determine a path between said second and said first endpoints by sending a communication from said second endpoint to said first endpoint;

(ii) a processor arranged to send a first message along said path in order to set up a first label mapping along said path, for use over said path in a forward direction; and (iii) a processor arranged to send a second message along said path in order to set up a second label mapping along said path, for use over said path in a reverse direction.

A corresponding computer program is provided stored on a computer readable medium said computer program being arranged to control said communications network such that:

(i) a communication is sent from said second endpoint to said first endpoint to determine a path between said second and said first endpoints;

(ii) a first message is sent along said path in order to set up a first label mapping along said path, for use over said path in a forward direction; and (iii) a second message is sent along said path in order to set up a second label mapping along said path, for use over said path in a reverse direction.

This provides the advantage that a bi-directional communications session is established between two endpoints in a communications network. This enables telephony applications to be provided over a communications network such as an internet protocol communications network. In this case, the forward and reverse paths correspond and have the same bandwidth and quality of service provisions.

In a preferred embodiment of the method described immediately above, said steps (ii) and (iii) of sending messages in order to set up label mappings occur substantially concurrently. This provides the advantage that the time taken to establish the bi-directional communication session is reduced.

In a preferred embodiment a communications session is established which has a guaranteed quality of service. Switched virtual circuit equivalency is effectively given for a communications network which can be an internet protocol based communications network such as an MPLS network.

Preferably, said communications network comprises a plurality of nodes connected together by links and said method further comprises the step of configuring the communications network such that the links between a first plurality of nodes are of a pre-determined capacity such that in use each of said links between the first plurality of nodes is capable of sustaining a plurality of separate communication sessions. By provisioning the communications network in this way high capacity routes which act as "motorways" are created. By using these high capacity routes, the topology information required to implement the method is reduced. This simplifies the method and makes it faster to operate.

According to another aspect of the present invention there is provided a method of establishing a bi-directional communication session between a first endpoint and a second endpoint in a communications network, said method comprising the steps of:

(i) sending a communication from said first endpoint to said second endpoint to determine a path between said endpoints;

(ii) sending a message along said path in order to set up a first label mapping along said path, for use over said path in a forward direction; and also to set up a second label mapping along said path, for use over said path in a reverse direction.

A corresponding communications network is provided comprising at least two endpoints between which it is desired to establish a bi-directional communication session, said communications network comprising:

(i) a determiner arranged to determine a path between said endpoints by sending a communication from said first endpoint to said second endpoint; and (ii) a processor arranged to send a message along said path in order to set up a first label mapping along said path, for use over said path in a forward direction; and also to set up a second label mapping along said path, for use over said path in a reverse direction.

A corresponding computer program is provided stored on a computer readable medium said computer program being arranged to control said communications network such that:

(i) a communication is sent from said first endpoint to said second endpoint to determine a path between said endpoints; and (ii) a message is sent along said path in order to set up a first label mapping along said path, for use over said path in a forward direction; and also to set up a second label mapping along said path, for use over said path in a reverse direction.

This provides the advantage that a bi-directional communication session is set up quickly and effectively. The forward and reverse paths correspond and have the same bandwidth.

According to another aspect of the present invention there is provided a communications network comprising at least two endpoints between which it is desired to establish a bi-directional communication session, said communications network comprising:

(i) a processor arranged to establish a first uni-directional communication session between the endpoints in a forward direction; and (ii) a second processor arranged to establish a second uni-directional communication session between the endpoints in a reverse direction; and wherein said steps (i) and (ii) of establishing uni-directional communication sessions take place substantially concurrently.

A corresponding computer program is provided stored on a computer readable medium said computer program being arranged to control said communications network such that:

(i) a first uni-directional communication session is established between the endpoints in a forward direction;

(ii) a second uni-directional communication session is established between the endpoints in a reverse direction; and such that said steps (i) and (ii) of establishing uni-directional communication sessions take place substantially concurrently.

This provides the advantage that the first and second communication sessions are not necessarily corresponding and may take different paths. This is especially useful when a uni-directional error occurs in the communications network. By arranging for the two uni-directional sessions to be formed concurrently, setup time is reduced.

DETAILED DESCRIPTION OF THE INVENTION

Embodiments of the present invention are described below by way of example only. These examples represent the best ways of putting the invention into practice that are currently known to the Applicant although they are not the only ways in which this could be achieved.

The term "bidirectional communication session" is used to refer to a period of communication over a communications network that involves transfer of information from a calling party to a called party and vice versa. The bidirectional communication session uses either a single two-way communication path or a forward communication path and a reverse communication path.

Pending U.S. patent application Ser. No. 09/345,069, now pending, also assigned to Nortel Networks Corporation, describes a method of establishing a connection between two endpoints in an internet protocol communications network, to provide a guaranteed level of quality of service. The contents of U.S. patent application Ser. No. 09/345,069, now pending, are incorporated herein by reference.

Although the method described in U.S. Ser. No. 09/345,069, now pending, is in general effective, under some circumstances the time taken to establish such a connection is considerable, for example, for large communications networks such as carrier grade networks. Also, although the method described in U.S. Ser. No. 09/345,069, now pending, enables bi-directional communications session to be set-up, the resulting bi-directional communication sessions are not always optimally arranged for some situations.

Figure 1:
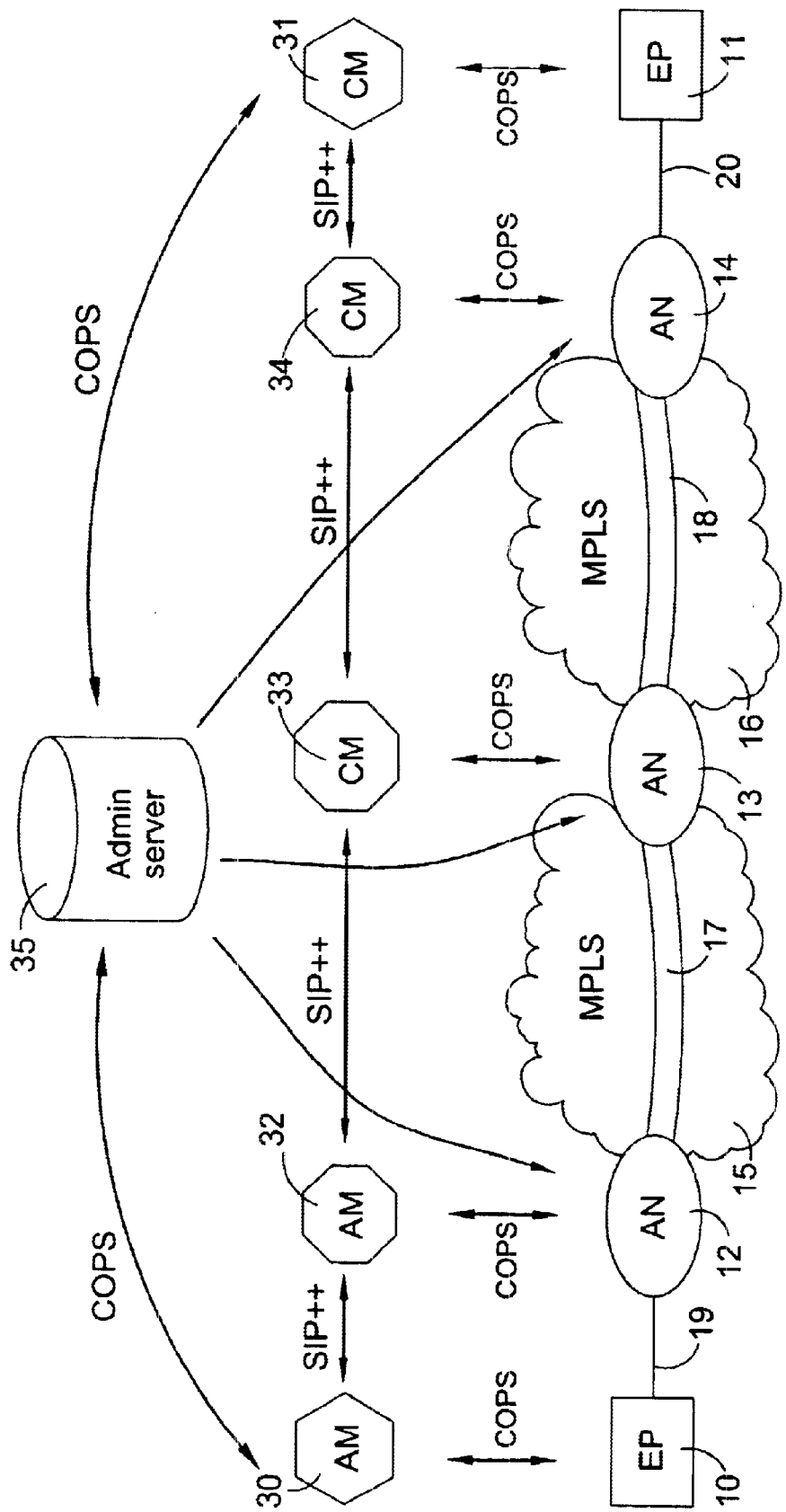
FIG. 1 is a schematic diagram of a communications network.

FIG. 1 is a schematic diagram of a communications network. A first endpoint 10 is connected to another endpoint 11 via a communications network which comprises a plurality of nodes that are connected by links. These nodes include three abstract nodes 12, 13, 14 and many other nodes which are not shown individually but which are represented by cloud shapes 15, 16 between the abstract nodes. These cloud shapes 17, 18 are intended to represent parts of the communications network which in one embodiment is an MPLS network. The cloud shapes 17, 18, nodes 12, 13, 14 and endpoints 10, 11 comprise a physical layer of the communications network.

Links 17, 18 are provided and these connect the abstract nodes 12, 13, 14 in series. Links 19, 20 are also provided to connect each endpoint 10, 11 to an abstract node and thus form a path or tunnel between the endpoints. However, this path from the first endpoint 10, via link 19 to abstract node 12 which is connected in series to abstract nodes 13 and 14, and then via link 20 to the second endpoint 11, is only one of many possible paths over the communications network which connect the two endpoints 10, 11. These other paths are not explicitly shown in FIG. 1 but are intended to be represented by the presence of clouds 15, 16. The links 17, 18, 19, 20 also form part of the physical layer of the communications network.

Data or messages which are transmitted over the communications network can be thought of as comprising two types. First, customer data or messages such as video signals, voice signals or email messages and second, control data or messages. This control data functions to help manage the communications network; for example, control messages may comprise signals broadcast by a node in the communications network to advertise its presence or its failure. The method of using the control messages is defined by the type of messaging protocol(s) used.

In a preferred embodiment of the present invention, the MPLS standard messaging protocol is used in conjunction with the CR-LDP messaging protocol to help manage the communications network comprising the endpoints 10, 11, the abstract nodes 12, 13, 14, the clouds of nodes 15, 16 and the links between these. However, CR-LDP, while able to make quality of service reservations across known paths, is unable to determine these paths itself. In the present invention additional components and messaging protocols are provided, for example, in order to determine and reserve guaranteed quality of service for particular connections for particular paths over the network.

These additional components comprise an administrative server 35, admission managers 30, 31 and connection managers 32, 33, 34 and together these components form a management layer of the communications network. The admission managers 30, 31 and connection managers 32, 33, 34 are referred to collectively as "management nodes". The additional messaging protocols include the standard Common Open Policy Service (COPS) messaging protocol and a modified version of the standard IETF SIP (Session Initiation Protocol) RFC2543 protocol although these are all examples of preferred messaging protocols; any suitable messaging protocols may be used. The modified version of SIP is designed to work in conjunction with COPS, CR-LDP and MPLS, although it could be designed to work with similar messaging protocols to perform the same function. This modified version of SIP will hereinafter be referred to as "SIP++".

In a preferred example, once a connection has been established using the method of the present invention, messages are transmitted over that connection using a protocol that involves labels. Each message or packet contains a header with a label and each abstract node contains a mapping which is a type of routing table. Using a label an abstract node is able to determine which next neighbour abstract node to forward the packet or message to. The mapping details, for received labels, which label should be given to the message or packet when it is forwarded by the abstract node. That is, when a message or packet is received by an abstract node, it identifies the received packet's label in the mapping and determines which label the packet should now be given and hence where the packet should be forwarded next. The packet is then issued with the new label according to the mapping and forwarded by the abstract node. In order for this method to enable messages or packets to be successfully transmitted between two specified endpoints, appropriate label mappings must be set up at the abstract nodes involved. In the method of U.S. Ser. No. 09/345,069, now pending, this is achieved after the SIP++ process is complete, using the CR-LDP protocol. That is, the SIP++ process is first used to determine a preferred path between two endpoints which will provide a guaranteed quality of service. Information about this path is then given to the physical layer and using the CR-LDP protocol an actual connection is established along the chosen path. This means that two effectively separate processes occur in series. In the present invention the label mappings are achieved in a different manner which enables the processes of choosing a suitable path and establishing a communication session over that path to be integrated rather than carried out in series.

In one example, Switch Virtual Circuit (SVC) admission control equivalency is provided with guaranteed quality of service on an MPLS or similar communications network. An SVC is a path over a communications network between two endpoints which is effectively dedicated for a particular communication session. These SVCs may be used to carry one or more communication sessions.

In the method of U.S. Ser. No. 09/345,069, now pending, two main stages were involved. The first stage involved selection of a path between the two endpoints using the SIP++ protocol. This SIP++ stage took place in the management layer of the communications network and involved propagation of control messages in at least one whole round trip between the two endpoints. Once this stage was completed, the second stage of using the CR-LDP protocol to establish a communication session over the selected path (selected in the SIP++ stage) took place. This second, CR-LDP stage also involved propagation of control messages in at least one whole round trip between the two endpoints. Because of this, the time taken to establish a connection using the method of U.S. Ser. No. 09/345,069, now pending, involved at least two round trip delays. As the communications network scales, a single round trip takes a considerable length of time and for carrier grade networks, the delay becomes a real problem when using the method of U.S. Ser. No. 09/345,069, now pending.

When a user requests a connection for a communication session this request is passed to an endpoint to which a terminal accessed by the user is connected. Means is provided to determine possible paths for the required connection together with measures of preference for these possible paths. The measures of preference (for example, ranks) are determined on the basis of factors such as traffic levels in the network, length of path, and available capacities. One path is chosen on the basis of the measures of preference. For example, a path with the highest rank may be chosen and reserved for the requested communication session. This gives a reserved path which can be used to provide a guaranteed quality of service for a particular communication session. Any suitable measure of preference such as a score, percentage value or rank may be used.

In an embodiment of the invention a ranking mechanism is used to select from the set of suitable paths, the route a new session will use to traverse an MPLS network. This set of paths and their ranking varies with network load.

In order that the ranks may provide an effective means for choosing between possible paths an advertising mechanism is provided which allows entities in the communications network to gain information about traffic levels, topology of the network and other factors. This information can then be used to help make the decision about which path to choose. The advertisement mechanism allows the system to choose routes best suited to the session being established. Two methods are proposed: explicit registration or by passively piggybacking information on path setup messages. The rate of advertisement is a function of the rate of session set-up.

As well as an advertising mechanism, in order to reduce the complexity of choosing a path, a mechanism is provided whereby an overlay network is configured to provide a set of high capacity routes across the MPLS clouds which function as "trunk" routes or "motorways". An arrangement is then made that communication sessions are preferably established using these pre-determined high capacity routes. This helps to reduce the topology information needed to establish a path across a communications network. By using a constrained set of paths between the routers that comprise the MPLS network, the set of routes is constrained to reduce the total topology information needed to route across the network.

Referring again to FIG. 1, it can be seen that the admission managers 30, 31 and the connection managers 32, 33, 34 as well as the administrative server 35 are depicted above the MPLS network. The admission managers, connection managers and administrative server can be though of as a "management layer" of the communications network. However, this layer is not physically independent from the rest of the communications network. For example, the SIP++ protocol control messages may be transmitted over the same physical links as the user information during communication sessions.

Each endpoint 10, 11 is associated with an admission manager 30, 31 and each abstract node 12, 13, 14 is associated with a connection manager 32, 33, 34. As indicated in FIG. 1, communication between the endpoints and their associated admission managers and between the abstract nodes and their associated connection managers is carried out using the COPS protocol. Also, communication between the administrative server 35 and the admission managers 30, 31 or abstract nodes 12, 13, 14 takes place using the COPS protocol. The way in which this is achieved using the COPS protocol is described in more detail below. However, communication between the admission managers and connection managers takes place using SIP++.

The characteristics of some of the components of the communications network are now described:

Abstract Nodes 30, 31

Abstract nodes are a concept introduced by the CR-LDP protocol and represent one or more label switch routers (LSRs) which are connected together by links. By using a description equivalent to a subnet mask a whole group of LSRs can be referred to. A subnet mask is an Internet Protocol (IP) mechanism used to define a group of IP nodes by only using the first n bits of their 32-bit IP addresses, where n is less than 32. The abstract nodes run the CR-LDP protocol and remain unaware of the SIP++ protocol running between admission managers and connection managers. Each abstract node may be directly configured by the Administrative Server, which may instruct an abstract node to establish a path to another particular abstract node. In the case where a CR-LDP network is used this path is referred to as a label switch path (LSP). SIP++ or any other suitable messaging protocol used provides a means of determining which of the label switch routers in an abstract node a path should be routed through.

By using abstract nodes when selecting path candidates for a new session it is possible to be presented with a set of diverse routes. This provides the advantage that different routes over the network can be utilised and this is especially helpful if it is required to "spread load" over the network and if problems occur in localised regions of the network.

Endpoints 10, 11

An endpoint is any node in the communications network through which a user may request a communication session on the communications network. For example, in the case that an MPLS communications network is used an endpoint can be any MPLS device; either an MPLS enabled terminal or a router at the edge of the network. New communication sessions requested by an endpoint are sent to an admission manager that is associated with the endpoint. That admission manager then uses the SIP++ protocol and a path for the requested session is determined and reserved in order to guarantee the requested quality of service. Once the admission manager has completed this task, the user request is validated and the validation communicated to the endpoint using the COPS protocol. Together with the validation, details of the chosen, reserved path are provided to the endpoint together with an identifier for the reserved path. If the request for a new session is granted, the endpoint runs the CR-LDP protocol using the exact same parameters that were used in the COPS request for a communication session together with the details of the chosen, reserved path. The CR-LDP protocol then establishes a path for the communication session according to the standard CR-LDP method described below. Each endpoint is therefore effectively unaware of the SIP++ protocol running between the admission managers and connection managers.

Admission Managers 30, 31

Each admission manager is responsible for maintaining network topology information and using this to select a route across the network. When an admission manager receives a request for a communication session from an endpoint 10, 11 it issues a plurality of path requests, which in a preferred example of the SIP++ protocol are referred to as INVITE messages. These path requests are control messages whose function is to request and determine possible paths between the required endpoints. In order to issue these path requests effectively, an admission manager needs to maintain accurate topological information about at least part of the communications network. Route advertisements are broadcast by entities in the communications network and an admission manager processes all the route advertisements it receives. This enables the admission manager to build up a map of all the reachable nodes on the MPLS network and their availability over time. An admission manager also monitors the bandwidth of connections to edge abstract nodes for the endpoint EP that it is associated with. (An edge abstract node is an abstract node that is positioned towards the edge of a communications network.) In this way an admission manager effectively provides admission control to the communication network. Communication between an admission manager and its associated endpoint is via an interface such as a COPS interface. An interface to the administrative server 35 is also provided, which may be a COPS interface. This allows endpoints to request new tunnels or paths (for example new "trunk" routes) in the communications network such as an MPLS network. An admission manager is also arranged to respond to INVITE messages issued by other admission managers. This is described in more detail below.

Connection Managers

Each connection manager is associated with an abstract node and as described above an abstract node may comprise one or more Label Switch Routers LSRs. However, it is not essential for all label switch routers to be associated with a connection manager.

Connections from these label switch routers to other abstract nodes are termed "label switch paths" (LSPs). Each connection manager monitors the bandwidth used in each of the label switch paths that emanate from the label switch router (or group of label switch routers) which it is associated with (or managing). It also is responsible for advertising the level of congestion in these label switch paths to other administrative elements (such as other connection managers and admission managers) on a slow but regular basis.

A connection manager also keeps a record of the destination abstract node for each of the label switch paths that it is monitoring. This information is also advertised by the connection manager. A connection manager also uses a COPS interface from the abstract node it is monitoring to allow registration of new label switch paths or a change in parameters of an existing label switch path.

Administrative Server

An administrative server 35 is used to provision paths in the communications network upon initialisation. For example, this involves establishing the label switch paths that the SIP++ protocol routes over. It is also used to change the characteristics of an existing path or introduce a new one. Although pictured as a single entity in FIG. 1, an administrative server 35 may take the form of multiple servers that administer their local area.

An Administrative Server is able to communicate directly with any label switch router in a 'known' abstract node. It uses CR-LDP over this interface to provision high capacity label switch paths between these label switch routers via any number of intermediate label switch routers. Typically this will be through label switch routers with no associated connection manager, though this need not necessarily be the case. An administrative server has a much more detailed view of the topology of the intermediate MPLS network than the endpoints attached to it. (The intermediate MPLS network being that part of the communications network which is not local to the endpoints.) By pre-provisioning label switch paths of high capacity the administrative server constrains the number of possible routes between two endpoints for a proposed communication session of a given capacity. This reduces the level of detail needed to make routing decisions. Such pre-provisioned label switch paths are referred to as "tunnels".

In a preferred embodiment, when the communications network is first established, it sets up a network of tunnels in the physical layer. These tunnels are subsequently registered with the management layer. That is, information about the source, destination and capacity of each tunnel is made known to the management layer. Each management node makes a record of the tunnels which originate or terminate at the abstract node associated with that management node. These tunnels are each uni-directional. However, in one embodiment, the tunnels are established such that equal sized tunnels exist in either direction between two label switch routers. That is, if an LSR is used in the path to an endpoint, for every tunnel that terminates on that LSR, a corresponding tunnel is provided from that LSR in the opposite direction.

An Administrative Server may also add new paths or change the characteristics of an existing path during the operation of the network. This may either be initiated by the network provider or via a request mechanism which is now described.

Request Mechanism

The Administrative Server 35 has a COPS interface to all the admission managers at the edge of the network. This interface is used by those admission managers to request new high capacity label switch paths across the MPLS network, or to request a change in the capacity of an existing LSP.

Figure 2:
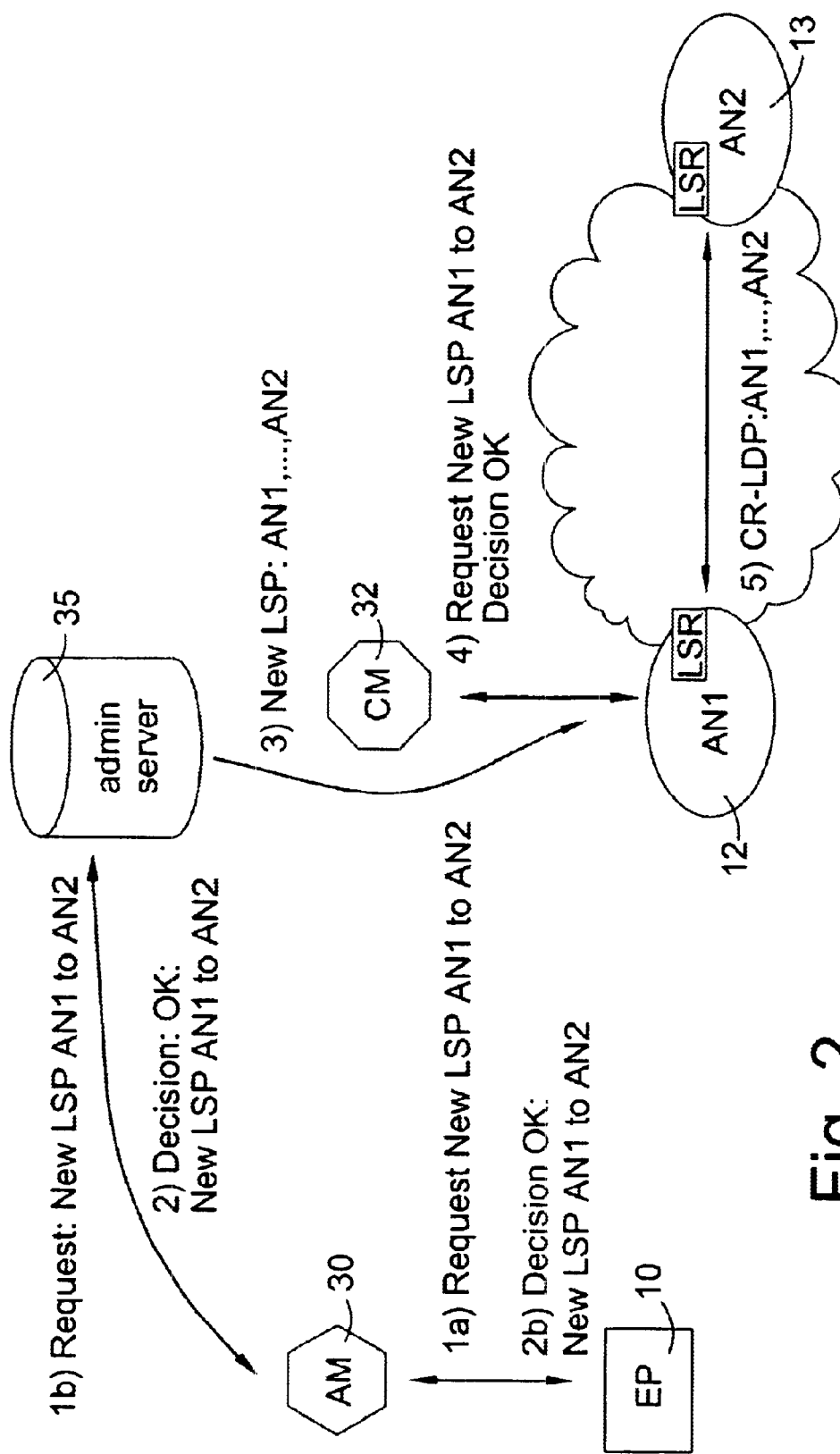
FIG. 2 is a flow diagram of the process of dynamic label switch path addition.

FIG. 2 shows the process of requesting a new LSP. Either an Endpoint 10 or an Admission Manager 35 issues a Request for a new route between two Abstract Nodes 12, 13 in the MPLS network. This is responded to by the Administrative Server, with the acceptance situation being illustrated in FIG. 2. The Administrative Server now signals to one of the specified abstract nodes AN1, 12 that it should set-up a path to the other abstract node AN2, 13. In the case that the abstract nodes represent a group of label switch routers, the administrative server specifies a particular label switch router within each abstract node.

The first abstract node 12 then registers the requested new path and its characteristics with its Connection Manager 32. This is achieved by issuing a COPS Request message over the COPS interface. The connection manager 32 does not refuse this Request under normal operation and issues a COPS Decision message to this effect. Once a Decision is received by the first abstract node 12, this abstract node proceeds to use CR-LDP to establish the connection to the other specified abstract node. Once the new route is established, the connection manager 32 begins to advertise its presence and the new route can be used immediately in the path for a new session.

SIP++

Figure 3:
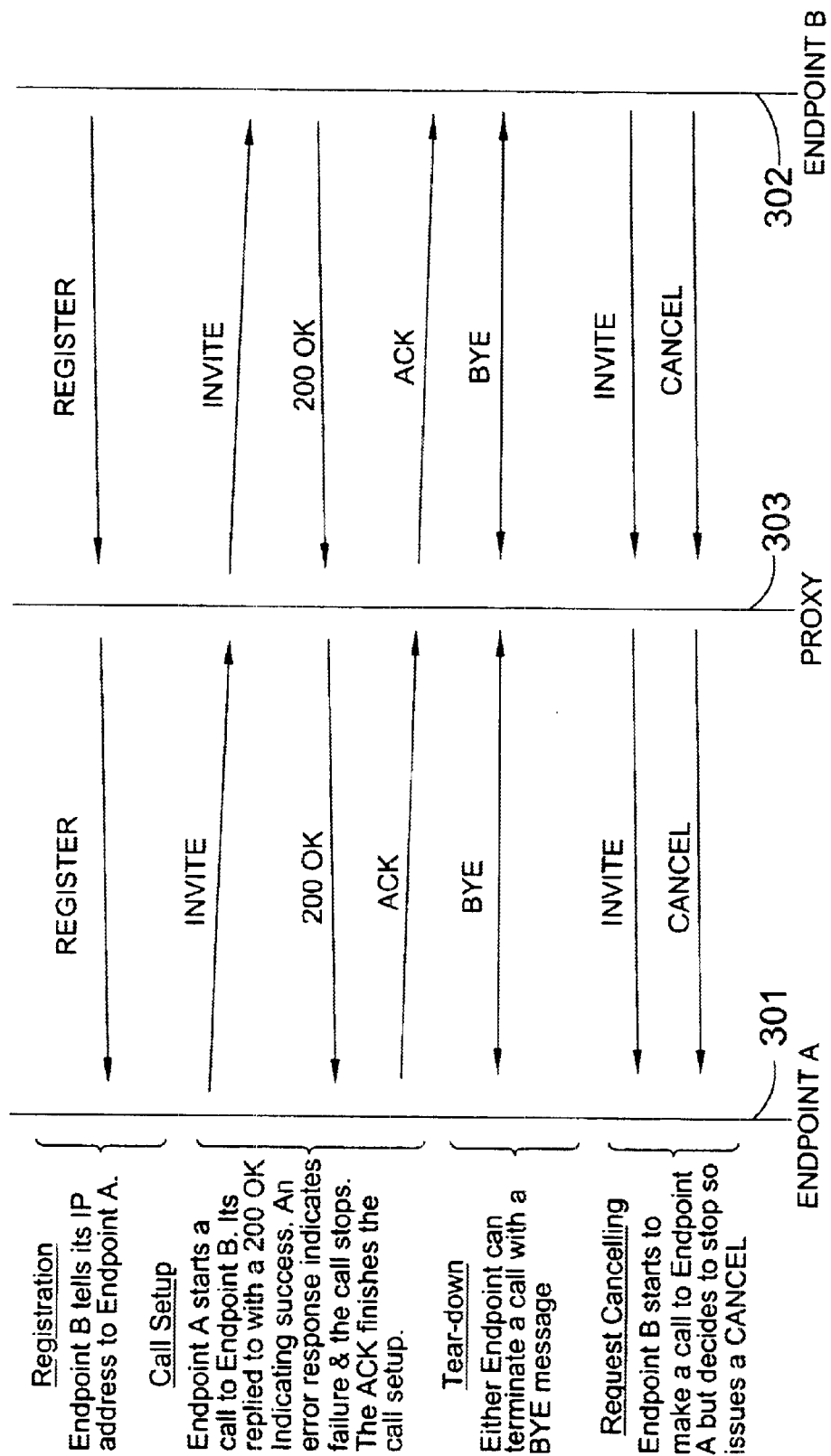
FIG. 3 is a flow diagram of basic SIP operation with a proxy.

A simplified SIP++ messaging diagram is provided in FIG. 3, with a brief explanation of the role of each message. These messages are similar to those of SIP but the contents of the messages are modified as compared to SIP. Vertical lines 301 and 302 in FIG. 3 represent two endpoints between which a proxy is located, which is represented a vertical line 303. Messages are sent between these endpoints and the proxy as indicated by the arrows between the vertical lines.

SIP++ Registration Method

The registration method involves an endpoint, such as endpoint B represented by vertical line 302, sending its internet protocol address to another endpoint, such as end point A represented by vertical line 301.

SIP++ Call Set-up Method

The call-set up method involves an INVITE message being sent from an originating endpoint 301 to the destination endpoint 302. If this INVITE is accepted by the destination endpoint 302 a so called 200 OK message is sent by the destination endpoint 302 to the originating endpoint 301. If the INVITE is not accepted an error response is sent in place of the 200 OK message. Once a 200 OK message is received by an originating endpoint an ACK message is returned to acknowledge receipt of the 200 OK message. This completes the call set-up.

SIP++ Tear Down Method

The tear down method involves either endpoint in a communications path terminating a call by issuing a BYE message to the other endpoint.

SIP++ Request Cancelling Method

This method involves for example, endpoint B 302 starting to make a call to endpoint A 301 and then deciding not to make this call after all. In this situation, endpoint B is able to issue a CANCEL message to endpoint A.

The method of establishing a path for a communication session with a guaranteed quality of service is now described together with an overview of the SIP++ method. Full details of SIP++ are described later.

When a COPS Request is received at an admission manager (requesting a path for a communication session), then providing admission is granted by the admission manager, one or more INVITE messages are sent out by the admission manager. The SIP++ INVITE message extends the standard SIP INVITE message to include a new message body type. Each INVITE message contains a description of the requirements for the desired communication session. For example, the traffic characteristics which are used to establish the path by CR-LDP. A path description is contained within this new body to find a route across the MPLS network that the new session could use. For example, the path description can be a list of nodes which must be visited in sequence to cross the network and reach the required endpoint. Some of the nodes may be unknown and represented as wildcards in the list. Each potential path is also assigned a rank which indicates the admission manager's preference for the route.

For a given INVITE message, the path description is examined and the first reachable abstract node in the list identified. The INVITE message is then sent to the connection manager associated with that reachable abstract node. This is repeated for each INVITE message issued by the admission manager.

When a connection manager receives an INVITE message, it examines the information about the session requirements and next abstract node to see if it has a path to that abstract node and if it can accommodate the new session. There may be more than one path depending on how well defined the abstract node is (for example, if the next abstract node is represented in the path description by a wildcard). If the answer is yes to both questions, it adds the explicit address (such as an IP address) of the abstract node that it is associated with to the INVITE message. An identifier for the connection manager itself is also added to the INVITE message. This information is added to a route-record header field of the INVITE message.

The connection manager then makes a temporary reservation for the session and forwards the INVITE message to the next abstract node in the path description. (If there is more than one abstract node at the next stage of the path description, the INVITE message is "forked" as described below.) If there are insufficient resources or there is no label switch path to the next abstract node in the path description, the connection manager will respond with an error message. This process is repeated until the INVITE messages reach the destination endpoint.

The destination endpoint waits for and collates the incoming INVITE messages. When these INVITE messages were issued by the originating admission manager, they were each assigned a rank by that admission manager. This rank indicates the favourability of a particular path and is scored based on how congested the network appears to the originating admission manager. The rank or other measure of preference is also determined on the basis of factors such as the suitability of the returned path to the type of session being established based on, for example, the latency of the path when establishing a real-time session. The admission manager associated with the receiving endpoint now assigns its own rank to the paths specified in the Record-Route header of each received INVITE message. For each path, the rank from the originating admission manager and from the receiving admission manager is combined in any suitable way, for example by addition, convolution or multiplication. The path and associated INVITE message with the highest scoring rank is then chosen.

As described above, each management node contains a record of any tunnels that originate or terminate at an abstract node associated with that management node. Each management node also advertises these tunnels to each of its next-neighbour management nodes, where a "next-neighbour" management node is one which is directly connected to the management node via a tunnel. Each such advertisement contains information about the source, destination and capacity of the tunnel concerned.

Each of the associated abstract nodes, (i.e. those at which a tunnel originates or terminates) advertises one or more labels that may be used by future communication sessions to traverse the tunnel concerned. These advertisements are made directly to their controlling admission manager to connection manager only, in the management layer. This differs from the method described in U.S. Ser. No. 09/345, 069 in which labels were not advertised from the physical layer to the management layer.

When an abstract node advertises a label, information about that label reaches and is stored or cached at the management node that is associated with the "downstream" end of the tunnel. The term, "downstream" is used to refer to a direction along a communication link which is towards the required destination of that communication link. The term, "upstream" is used to refer to the opposite direction. The advertisements are made using the COPS interface between the management and physical layers or any other suitable interface and message protocol. For example, a Label Distribution Protocol (LDP) and interface may be used.

At this stage in the method, the preferred path has not yet been chosen using the SIP++ method and yet labels for use in a communication session are already being advertised. In this way the two processes of path selection and session establishment become integrated.

Figure 11:
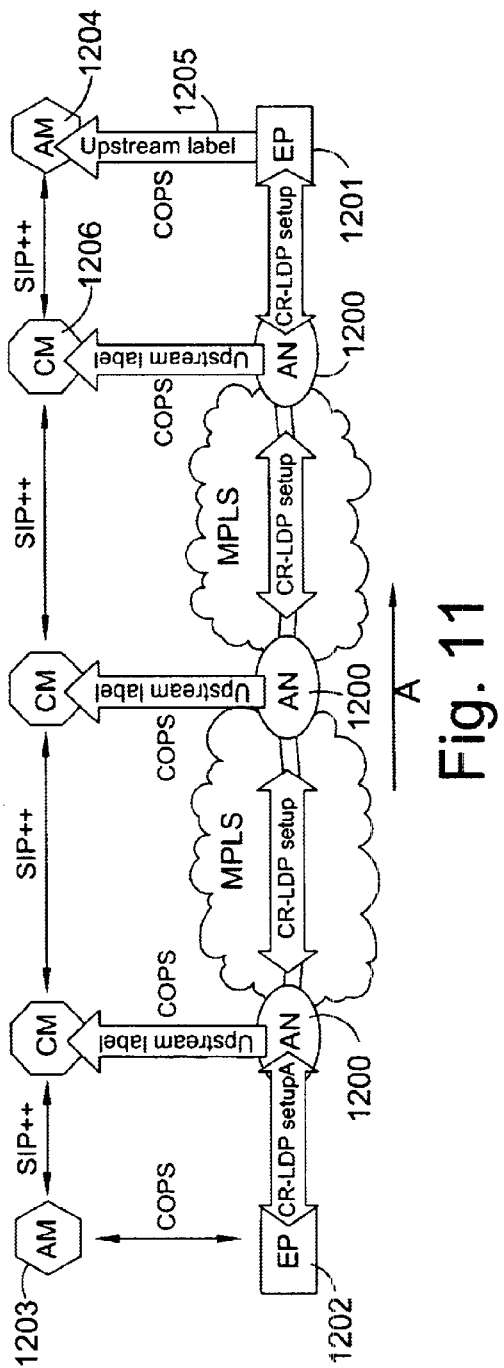
FIG. 11 is a schematic diagram illustrating advertisement of labels by label switch routers.

FIG. 11 illustrates the advertisement of labels by abstract nodes or label switch routers (LSRs). FIG. 11 illustrates a communications network with a physical layer comprising abstract nodes 1200 and endpoints 1201, 1202 in an MPLS communications network. The communications network has been pre-configured as described above and tunnels are provided in the direction indicated by arrow A. A communication session is required to be established between endpoint 1202 and endpoint 1201 in the direction of arrow A. This direction is termed "downstream".

As described above the first stage of the SIP++ negotiation process takes place as in U.S. Ser. No. 09/345,069, now pending. That is, INVITE messages are sent from an admission manager 1203 associated with the first endpoint 1202, to the admission manager 1204 associated with the second endpoint 1201. The next stage of the SIP++ process involves sending back a 200 OK response from the second or destination endpoint 1201 to the originating endpoint 1202. During this 200 OK response stage, advertised labels are chosen in such a way that a label mapping is established at each LSR. Then once the 200 OK response reaches the originating admission manager 1203, label mappings have been established at each LSR along the route. Because the labels are selected during the 200 OK response stage, which is an upstream process, the labels have to be selected in such a manner that they can later be used for the required downstream communication session. This is achieved as described below.

When an abstract node advertises a label (see 1205 in FIG. 11), information about that label reaches and is stored or cached at the management node 1204 that is associated with the "downstream" end of the tunnel. For example, as shown in FIG. 11, labels advertised by endpoint 1201 are stored at admission manager 1204 rather than at connection manager 1206.

The receiving admission manager now forms a 200 OK response to the chosen INVITE message. The 200 OK response needs to be returned along the same path as the chosen INVITE message arrived. The path along which the chosen INVITE message arrived is known from the details of each abstract node passed on route. This information is taken from the Record-Route header of the chosen INVITE message and used to form a new path description for the 200 OK message. Also, the Record-Route header of the chosen INVITE message is copied into the 200 OK message. The 200 OK message is then sent back to the originating admission manager.

However, before the 200 OK response is sent back, the admission manager 1204 (FIG. 11) consumes a label for the communication session. That is the admission 1204 manager selects one of the advertised labels that are stored or cached at that admission manager. The admission manager then informs its associated endpoint 1201 that it has chosen a particular label, in order that the endpoint 1201 does not advertise that label as being available any more. The admission manager also informs its associated endpoint 1201 about the identity of the required communication session. The endpoint then knows that the chosen label and the required communication session are associated.

The admission manager 1204 now sends the 200 OK response together with the chosen label, to the first connection manager 1206 in the record-route list. That connection manager 1206 then converts its temporary reservation for the requested communication session into a permanent reservation. Next, the connection manager 1206 examines the record route list to identify which connection manager to forward the 200 OK response to. Supposing that this next connection manager is 1207 in FIG. 2, the first connection manager 1206 determines a tunnel to connection manager 1207 and consumes a label for that tunnel. That is, one of the labels cached at the first connection manager 1206, which is suitable for the chosen tunnel, is selected.

Information about this chosen label is sent from the first connection manager 1206 to its associated abstract node in order that that abstract node does not re-advertise the particular label. Also, information about the previously chosen label (that suitable for the journey between the first connection manager 1206 and the destination endpoint 1201) is sent from the first connection manager 1206 to its associated abstract node. This enables the associated abstract node to set up a label mapping. In future, if the associated abstract node receives a packet with a label corresponding to the most recently chosen label, it "knows" to forward the packet to the destination endpoint using the previously chosen label.

Figure 12:
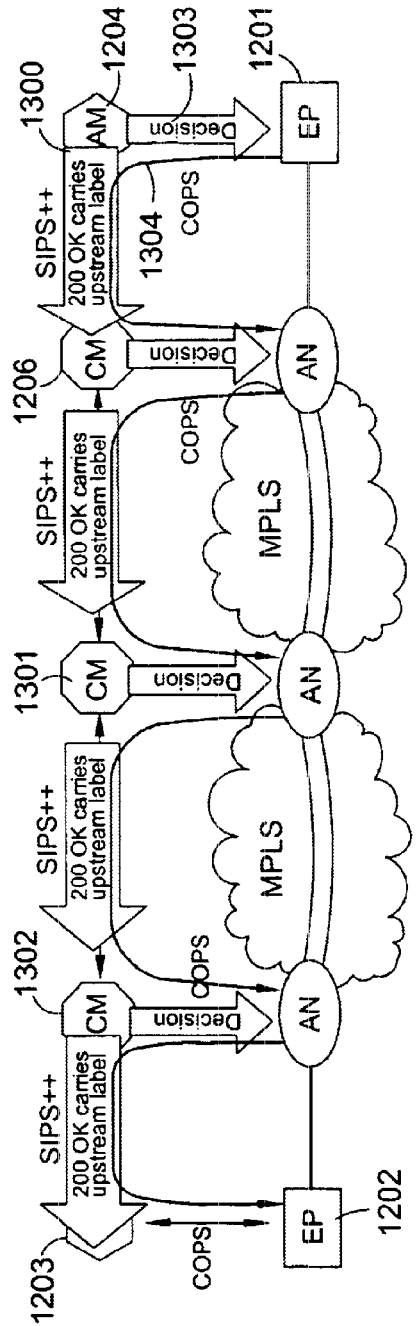
FIG. 12 is a schematic diagram of the process of label propagation.

The first connection manager 1206 then sends the 200 OK response to the next connection manager together with the most recently chosen label and the process repeats until the 200 OK response reaches the originating admission manager 1203. This process is illustrated in FIG. 12 which shows a 200 OK response 1300 carrying a label between the destination admission manager and the first connection manager 1206, and also between subsequent connection managers 1301, 1302 in a path to the originating admission manager 1203. Communication between the physical and management layers is also illustrated. Decisions about which label to select are sent from the management layer to the physical layer and information about corresponding pairs of labels is communicated 1304 between next-neighbour abstract nodes in the physical layer.

When the 200 OK response reaches the originating admission manager 1203, the originating admission manager 1203 informs the originating endpoint 1202 which label it should use to reach the first abstract node (or LSR) in the selected path. This information is matched up with a session description that the originating endpoint holds for the forward mapping of the required communication session. At this point the path between the endpoints 1202, 1201 is completely specified and established for the required communication session. This is achieved without the need for a separate CR-LDP negotiation to take place, after the SIP++ negotiation is complete. Hence, one complete round trip of control messages is eliminated and this significantly reduces session setup time.

Figure 13:
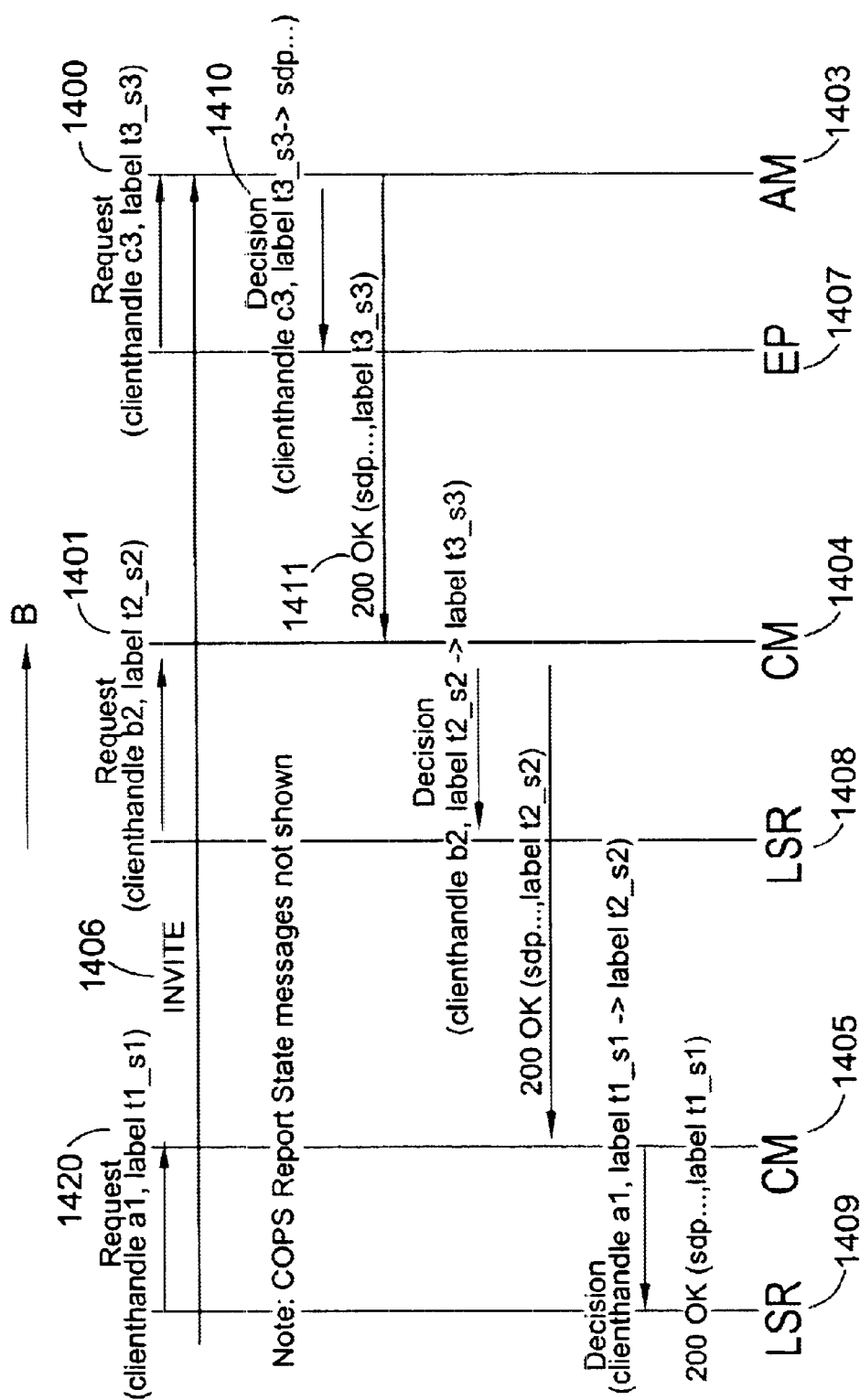
FIG. 13 shows details of a COPS messaging process.

FIG. 13 illustrates the details of the COPS messaging process for the situation where the registration of tunnels is already complete and advertised labels have been cached. In FIG. 13 the management nodes and physical nodes are represented by vertical lines with pairs of management nodes and associated physical nodes next to one another. The downstream direction is indicated by arrow B.

One cached label 1400, 1401, 1402 is shown for each management node 1404, 1404, 1405 but this is for illustrative purposes only. A plurality of labels may be cached at each management node.

An INVITE message 1406 is illustrated as being received at the destination admission manager 1403. The destination admission manager then consumes a label, which in this case is the only label 1400 cached at that admission manager. The destination admission manager informs its associated endpoint 1407 of the consumed label 1400 in a decision message 1410. The decision message 1410 contains information about the consumed label, in this case, label t3-s3 and also label to session mapping information, in this case, label t3_s3→sdp. As well as this the decision message 1410 contains client handle information, in this case, clienthandle c3, which enables the endpoint to cross-check the indicated label.

The destination admission manager 1403 now sends a 200 OK response 1411 and adds to this the chosen label, in this case, label t3_s3. When the first connection manager 1404 receives the 200 OK response 1411, it determines the next connection manager 1405 in the path and consumes an appropriate label, in this case label 1401. The first connection manager 1404 then indicates this consumed label 1401 to its associated label switch router 1408 together with information about the previously consumed label 1400. The label switch router 1408 then "knows" to make a mapping between label 1401 and label 1400.

FIG. 13 does not illustrate COPS report state messages. These can be used as checks to ensure the correct label mapping was established. For example, when a decision is received by a physical node from a management node, a report message may be sent back from the physical node to the management node detailing the established label mapping. A check can then be done that the correct label mapping was made. Also, in the event that an incorrect label mapping is supplied from the management layer to the physical layer, then a report state message can be used to alert the management layer to this error. This error message may trigger a SIP error message which enables the path to be re-negotiated.

Alternatively, report state messages can indicate that a different label was used (other than the one indicated in the decision message) in order that the subsequent 200 OK message may incorporate the label that was actually used. In this case, the actually used label is marked in the 200 OK message in such a way that that each management node re-does its label mapping negotiation and frees the previously consumed label.

Figure 14:
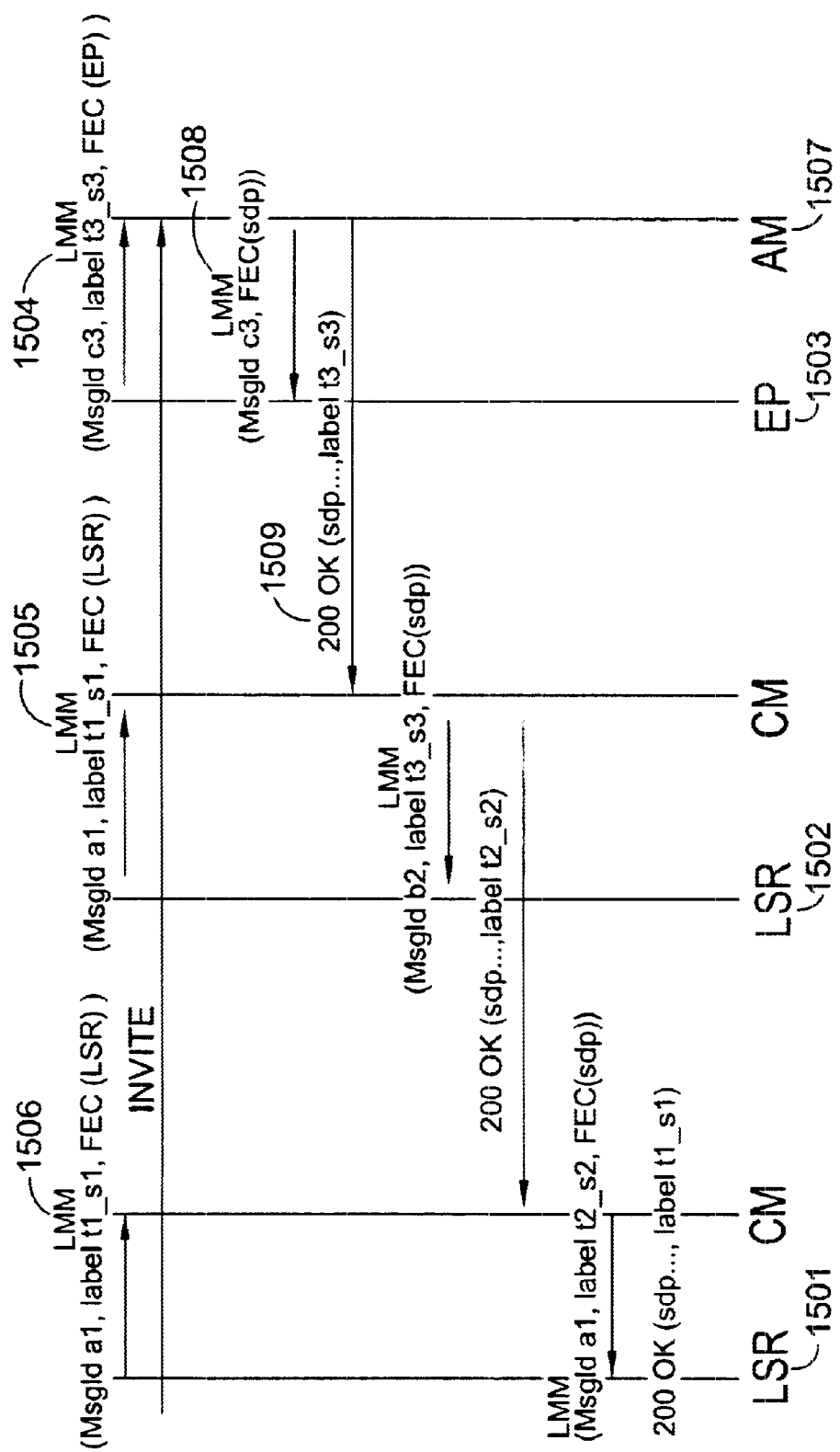
FIG. 14 shows details of an LDP messaging process.

As mentioned above, an LDP messaging process may be used instead of the COPS messaging process. An LDP messaging process is illustrated in FIG. 14. As for FIG. 13, management nodes and physical nodes are represented by vertical lines.

LSRs 1501, 1502 and endpoints 1503 advertise their available labels using Label Mapping Messages 1504, 1505, 1506. Each Label Mapping Message (LMM) includes an address which is the destination of the tunnel for which the label is advertised. This address is called a Forwarding Equivalence Class (FEC).

Once a label is consumed by a management node, information about the selected label is communicated to the associated physical node using further "response" LMMs. For example, admission manager 1507 consumes LMM 1504 and communicates this information to its associated endpoint 1503 via a "response" LMM 1508. The response LMM 1508 contains a message identifier, in this case, Msgld c3, which is the same as the message identifier for the consumed label 1504. The endpoint 1503 is then able to create a mapping between the label it advertised 1504 using this message identifier and the label it has received from the admission manager 1507.

Each response LMM also contains the FEC of the session so that the label is uniquely linked to the particular session. The FEC can be extended to include a port number. This prevents confusion in the event that multiple sessions to the same user are required, because non-extended FECs only contain an Internet Protocol address.

Once the admission manager 1507 has consumed a label 1504, it includes this label in a 200 OK response 1509 and forwards the 200 OK response to the next connection manager 1505 in the record route header. The process then repeats until the 200 OK response reaches the originating admission manager (not shown in FIG. 14).

Shortly after the originating endpoint and admission manager have received the 200 OK response, all the remaining temporary reservations (that have not been converted to permanent reservations) time-out.

Using this method, each endpoint need only be aware of the congestion locally yet it is possible to choose a path with the most favourable end-to-end congestion. Each admission manager and its associated endpoint are referred to as a "decision point". If the network is expanded to include many abstract nodes then it is possible to use intermediate decision points between the decision points associated with each endpoint. This helps to ensure that congestion information does not become too stale, and addresses the problem of congestion at locations distant from an endpoint being difficult to determine i.e. when there is no visibility of congestion from a given endpoint.

Having received the 200 OK response, the originating endpoint and its associated admission manager complete the setup with an ACK message. The ACK message needs to be sent back to the destination endpoint along the chosen route. The Route header for the ACK message is determined from the Record-Route header of the 200 OK message. The originating admission manager then sends the ACK message along the exact path chosen. It is not essential to use an ACK message; however, ACK messages are a required part of the SIP protocol and are therefore used in the present example, to reduce the modifications required to the SIP protocol in order to form the SIP++ protocol.

Path Selection Alternative

In a preferred embodiment, as described above, a soft state mechanism is used at each of the connection managers in the path that a successful INVITE message traverses. A short-lived reservation that holds the session bandwidth in each label switch path is made such that the bandwidth cannot be offered to other proposed communication sessions. This soft-state is confirmed by the final path decision message (e.g. 200 OK message) that turns this temporary reservation into a hard state. In the meantime the other reservations time out.

In this preferred embodiment there are two possible points at which the reservation can be made. If the INVITE message includes the rank for each suggested path then the receiving endpoint can make a decision as soon as it has received all the INVITE messages for a session. The 200 OK reply can then be routed over the selected path and used to reserve the bandwidth at each of the connection managers traversed. The final ACK in this case can be used to return any session identifying labels to the called endpoint.

In the other scheme, the originating admission manager sends no rank information in its INVITE messages. It waits for 200 OK responses from the called admission manager and assigns a rank to each of the returned path alternatives. It then makes a decision based on the ranks it has assigned and those it has received from the called admission manager. An ACK message is then used to traverse the chosen path and reserve the bandwidth at each of the connection managers it passes.

Alternative Reservation Options

Two other schemes for reservation of bandwidth at the connection managers along the chosen path across the MPLS network are now described.

In a first scheme the standard CR-LDP protocol is modified to include a new CR-LDP Type-Length-Value element (TLV) that defines the Call-ID of the SIP++ session that reserved the bandwidth. Alternatively a vendor specific TLV type within the standard CR-LDP is used. In this case, when the CR-LDP method is used to establish a path for the session (after the path has been reserved using the SIP++ protocol) the Call-ID is used to make sure that the CR-LDP method sets up the same path as that selected by SIP++. During the CR-LDP method to establish a path for the session, each label switch router in the path uses COPS to interrogate its associated connection manager with the Call-ID. This is done using COPS request messages. On request the connection manager returns the label switch path (of the reserved path chosen by SIP++) down which the session should be directed, using a COPS Decision message.

Alternatively, the connection manager uses a Synchronise State Request to signal a change in client (in this case label switch path) state with the update arriving in the form of the CR-LDP message itself. When this 'update' is received the label switch router responds with a Synchronise State Complete message. Using this method, each connection manager advertises the reserved path to its associated label switch router to ensure that the reserved path is used As an alternative to making a soft-state reservation permanent using an SIP++ message, Request messages sent by label switch routers to their associated connection managers can be used to make the reservation in the connection manager.

In the alternative method, on receipt of the Request containing the Call-ID of the session, the connection manager matches the Call-ID to the Call-ID of a previously received INVITE message and makes the reservation for the session.

More Details About SIP++

The INVITE method of SIP is re-used in SIP++ with a new body type, a changed use of the SIP INVITE method and a slightly changed header type.

The header type is the Record-Route header. It operates in essentially the same manner as in standard SIP but the manner in which it is filled in is different. The Record-Route header is used to log a set of nodes that all subsequent SIP responses must be routed through. Typically this is used by proxies to monitor session set-up.

Figure 4:
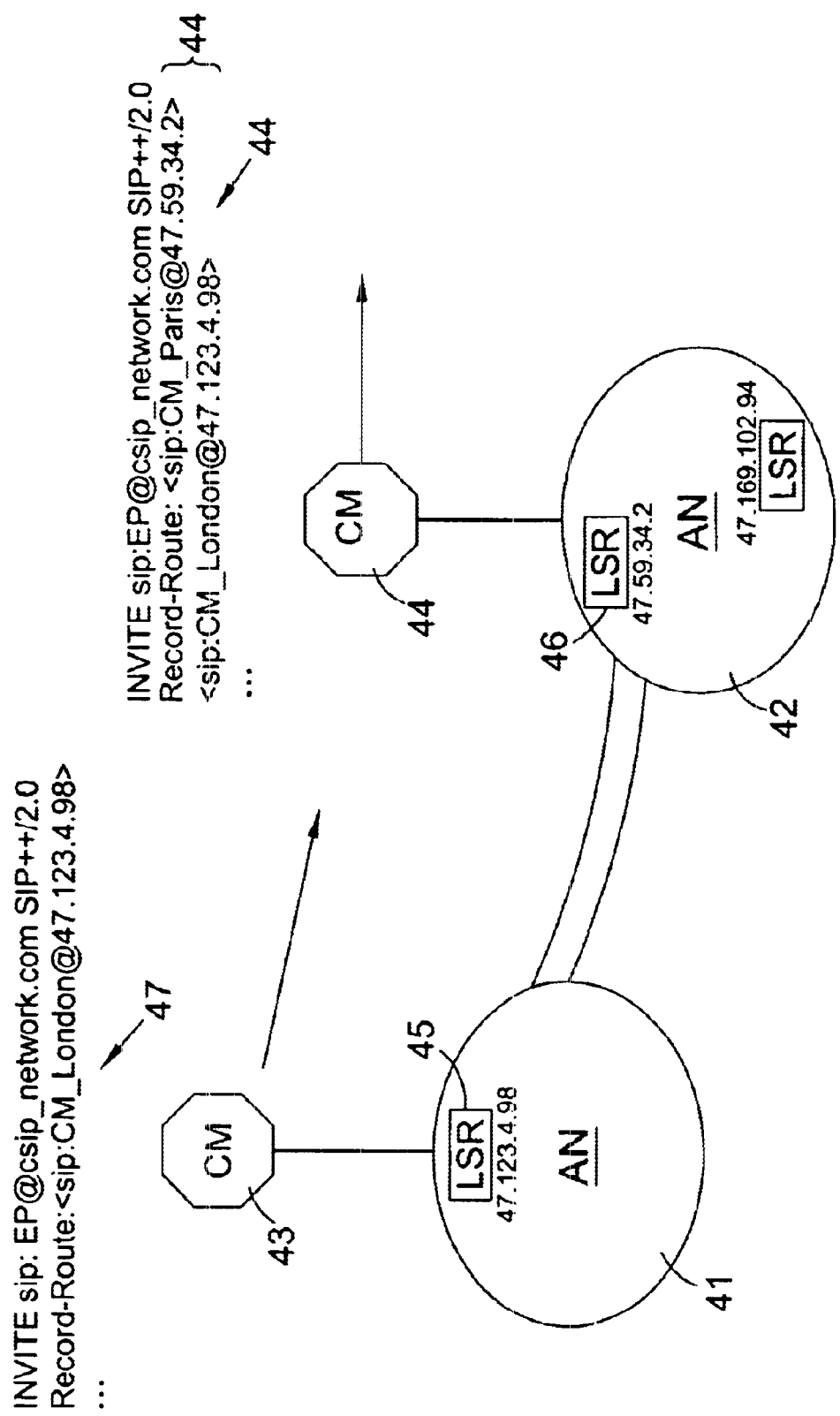
FIG. 4 is a flow diagram showing use of a record-route header to track a route.

Under SIP++ operation, when a connection manager receives an INVITE message, it appends a SIP-URL (Universal Resource Locator) of its identity to the Record-Route header. This identity consists of the name of the connection manager and the IP address of the label switch router it is administering e.g. sip:CM Harlow@1.2.3.4. Where CM_Harlow is the name of the connection manager and 1.2.3.4 is the IPv4 address of the label switch router. Each subsequent connection manager appends its SIP-URL to the front of the list of SIP-URLs. This process is illustrated in FIG. 4 which shows two connection managers 43, 44 together with their associated label switch routers 45, 46 which are each part of an abstract node 41, 42. One connection manager is called "CM London" and the other "CM Paris" as illustrated. For CM London, the IP address is 47.123.4.98 and for CM Paris, 47.59.34.2. The record-route header of an INVITE message received by first CM London and then CM Paris are shown 47, 48 and it can be seen that for CM Paris the SIP-URL for this connection manager has been appended to the front of the list of SIP-URLs. When a Route header is present in a SIP message it defines a set of nodes that the message must be routed through. A connection manager can thus be regarded as acting like a SIP Proxy.

The SIP++ message body introduces six new elements as compared to a standard SIP message body and these are now described.

Abstract Node Element.

This element is used to specify a particular abstract node. Parts of the specification for the abstract node can be "wildcarded" (for example, if it is required to find all possible routes which pass through an abstract node which meets certain specifications). The abstract node element uses the following notation: {prefix length, IP address}, where the prefix length acts like a subnet mask for the IP address field and specifies the number of bits, starting with the MSB (Most Significant Bit), of the IP address which are used to describe the Abstract Node. If a prefix length of 32 is used, the whole IP address is significant and this is termed an explicit address. For example, {24, 47.209.3.1} defines an Abstract Node whose elements' IP addresses begin with 47.209.3 and {32, 47.209.3.1} defines an Abstract Node with the explicit address 47.209.3.1.

Another example is {0, 47.209.3.1} which defines an Abstract Node with no completely defined IP address. Use of the zero at the front of the element is equivalent to a wildcard value and useful when the originating endpoint has an incomplete view of a part of the network, or wishes to find out how many paths exist over a particular leg. A short form of the wildcard value, for example: {*,*} may also be used.

Path Element.

This is a string of Abstract Node definitions—in 200 OK and ACK messages it is a string of explicit addresses. It contains as many abstract node definitions as there are hops across the MPLS network to the destination endpoint. (A "hop" is a path between two abstract nodes) A path element has the following format: Path={{AN1}, {AN2}, {AN3}, . . . , {EP}} where the last element in the path is the explicit address of the destination endpoint (otherwise routing is impossible).

A path element may contain wildcard characters. However, to avoid unnecessarily large amounts of signalling, there are preferably no more than two successive wildcard addresses in a path definition. There may only ever be one path element per message body.

Rank Element

This is a score from 0–10 that indicates the preference an endpoint has for a particular path, with 10 being the favourite route. If a score of 0 is received for a particular path, this indicates that it is totally unacceptable and should not be used. An example of a rank element is: Rank=6.

Traffic Element

This element uses the exact set of parameters that the Traffic TLV in CR-LDP uses, namely: Peak Data Rate (PDR); Peak Burst Size (PBS); Committed Data Rate (CDR); Committed Burst Size (CBS); Excess Burst Size (EBS). All the rates are quoted in KBPS. An example of a traffic element is: Traffic={PDR=128, PBS=512, CDR=96, CBS=256, EBS=512}.

Label Element

This is used to convey any locally assigned path or "label" information from one endpoint to another; typically from the originating endpoint to the called endpoint. The session at the originating endpoint is mapped into a particular label switch path over its first hop with many other sessions. In order to allow differentiation at the called endpoint (and thus faster onward routing) a second label is inserted at the bottom of a label stack which remains unpopped until received by the called endpoint. Label elements are used by ACK messages only. Also, depending on the coupling between the endpoint and admission manager, label elements are only sent once CR-LDP negotiation is complete. An example of a label element is: Label=928.

Resource Class Element

This element is used to indicate the resource class of the session for the purposes of DiffServ support. An example of a resource class element is Class=42. It is not essential to use resource class elements if DiffServ support is not required.

Resource class elements may also be used to group sessions in a particular label switch path. Where multiple label switch paths exist between two abstract nodes, the selection of which of these to use for a new session can be made if each of these label switch paths carries a distinct set of Resource Classes. For example, a pre-configured path may be arranged to only carry a session whose resource class lies in the range 20–500. This also allows label switch paths to be tailored to suit particular session types.

The SIP++ protocol makes use of 4 of the main SIP methods in a new form, namely: INVITE; ACK; REGISTER and BYE. The operation of these methods in the SIP++ protocol is now described.

INVITE Method

One way in which the SIP++ INVITE method differs from the standard SIP INVITE method involves so called "forking". When the next abstract node in a path element results in a number of possible paths for the next hop, the INVITE message is duplicated and sent along each possible path. This is termed "forking". In SIP++ forking is only arranged to occur if the next-but-one abstract node is reachable through the next abstract node. However, in standard SIP forking does not rely on topological information; forked INVITE messages are simply sent down all possible paths when forked.

Figure 5:
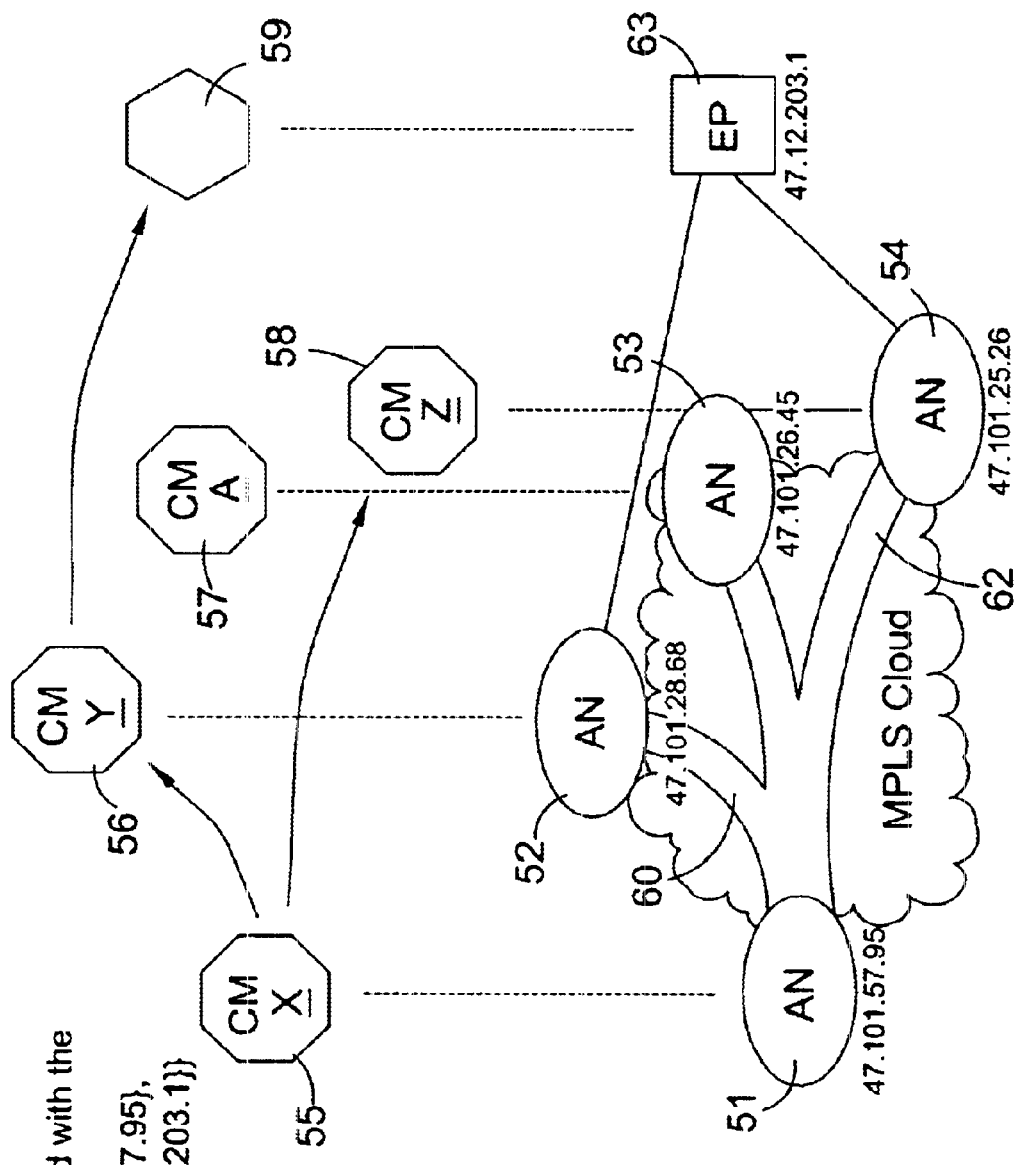
FIG. 5 is a flow diagram showing forking with non-explicit abstract nodes.

Forking in SIP++ is illustrated in FIG. 5. Four abstract nodes 51, 52, 53, 54 are illustrated each having an associated connection manager 55, 56, 57, 58. Connection manager X 55 receives an INVITE message with the next hop wildcarded. It has 3 label switch paths 60, 61, 62 down which it might fork the INVITE message. The connection manager X 55 therefore examines the next abstract node definition, in this case an endpoint 63 address. Having done this, CM X 55 realises that paths only exist to the destination endpoint 63 via the abstract nodes 52, 54 administered by connection manager Y 56 and connection manager Z 58. The INVITE message is thus only forked to these Connection Managers 56, 58 and not to connection manager A 57. This example illustrates the need for each Connection Manager to maintain topological information over two hops.

SIP++ permits multiple INVITE messages to be issued with the same Call-ID (but with an incremented identifier called a "Cseq"), without first receiving a 200 OK response for the first INVITE. However, under standard SIP operation, each INVITE message is issued sequentially and must be responded to either with an error or a 200 OK.

On receipt of a 200 OK message by an admission manager or connection manager, the session described by the associated INVITE message is considered established and no further INVITE messages need to be sent. SIP++ allows a destination endpoint to choose a path from a number of INVITE messages and to respond with a single 200 OK message. To avoid confusion, each INVITE message whose path was not used is sent an error response indicating the path was not used. This error response contains the CSeq identifier of the unsuccessful INVITE message. It is a preferred embodiment that these Error messages be sent, though their omission has no detrimental effect to the operation of the protocol.

Figure 6:
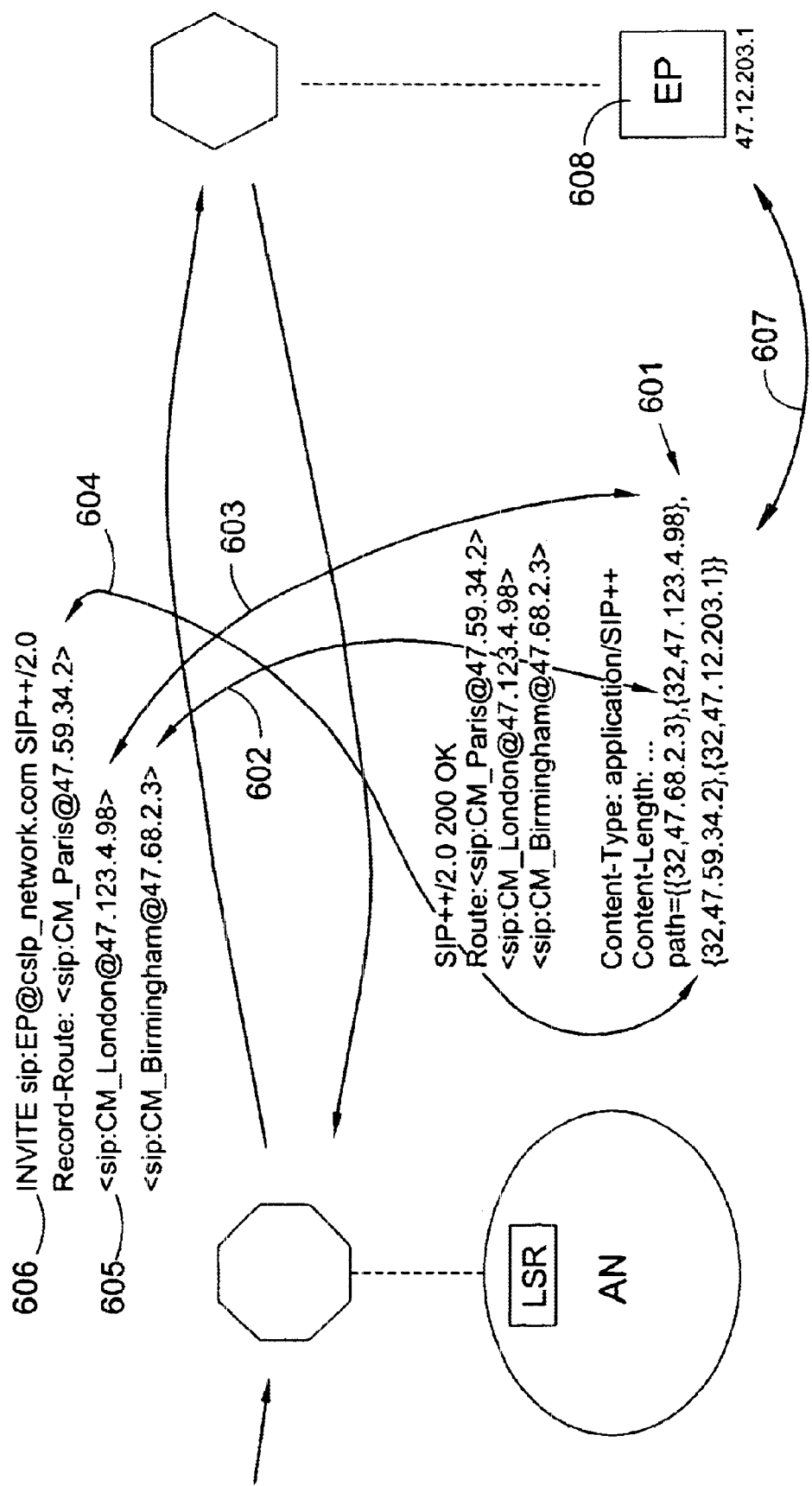
FIG. 6 is a flow diagram illustrating the process of forming a path element from a record-route header.

A 200 OK response issued by an admission manager includes the CSeq of the INVITE associated with the chosen path. As illustrated in FIG. 6 the body of the 200 OK message includes a path element 601 for the selected path. This is formed from the label switch path IP addresses 602, 603, 604 listed in the Record-Route header 605 of the INVITE message 606. These IP addresses are listed in the path element as explicit Abstract Nodes. They are retrieved in the order in which they were appended to the INVITE message, so that the left-most SIP-URI in the header gives the right-most abstract node in the path element. A destination endpoint 608 then adds its own IP address 607 to the path element.

The originating admission manager is able to correlate its successful requested path element that it sent with the actual path reserved, and store this for future use.

The number of INVITE messages which may be issued for a particular session depends on both the number of diverse routes an endpoint wishes to explore, and whether the originating endpoint receives a satisfactory response to an INVITE message. It is preferred that the number does not exceed about 5 INVITE messages.

Diverse routing can easily be achieved by issuing a number of concurrent INVITE messages for the same session. These use the same Call-ID but different CSeq value. The receiving endpoint then chooses whether to reply to all the INVITE messages with a single 200 OK message, or to reply with one 200 OK message per INVITE message received.

There therefore exists at least two mechanisms within SIP++ for diverse routing, firstly by using wildcard or short prefix abstract nodes, and secondly by sending multiple INVITE messages for the same session.

ACK Method

The ACK is used in the same way as in standard SIP. It is used to terminate an INVITE message as described above.

REGISTER Method

The REGISTER method is used to update the topology and congestion information in the network, and also to inform Connection Managers and Admission managers of the existence of a label switch path. When a label switch router receives a path set-up message from the administrative server, it sends a Request message over the COPS interface to its connection manager. This triggers the connection manager to broadcast a REGISTER message to all neighbouring connection managers that details the new path in terms of its size and the abstract nodes between which it exists. This initial advertising may either be to all neighbouring connection managers or just to those whose abstract nodes have a preferred label switch path to the newly configured abstract node. The REGISTER is then forwarded one hop further such that all connection managers and admission managers now have information about the topology of the network up to two hops away.

REGISTER messages are also used as periodical updates of the state of each label switch path. In this case, the information sent is the remaining free space in the label switch path and the abstract nodes between which the label switch path runs. These REGISTER messages are only sent to those connection managers whose abstract nodes have a direct connection to the sending connection manager's abstract node. The REGISTER messages are then forwarded over the next hop in the same manner. The distance over which they are sent can be limited using the Max-Forwards SIP header. The time period for these updates is arranged to be short enough that the topology and congestion information in the network does not become stale, but long enough that the network does not become flooded.

Congestion information may, additionally, be piggy-backed on INVITE and 200 OK messages. This involves attaching the congestion body type onto the end of the normal INVITE message. If such a mechanism is used, it restarts the REGISTER update timer every time an INVITE message is used in this way. The period for this mechanism may be on an every n packets basis, where n is small, for example 20. In this way, at times of heavy session set-up, and thus high flux in the network congestion state, more regular congestion information is exchanged. This mechanism is not used to notify a new label switch path—this is always achieved using the REGISTER method.

A REGISTER message is not forwarded along the label switch path that the message describes. Similarly, the congestion information attached to INVITE and 200 OK messages does not describe the tunnel being traversed. In this way, congestion can always be fed upstream to provide negative feedback, control and network stability.

ERROR Messages

New error messages are needed for the SIP++ protocol. Five are needed and these have subtly different meanings:

1) 801 Congestion: LSP unable to take new session
2) 802 Congestion: LSP has reached its capacity—may be issued following a successful set-up
3) 803 Not available: LSP has temporary fault (other than it is congested)
4) 804 Not available: No such LSP exists.
5) 810 Path not used (in response to an unsuccessful INVITE)

BYE Method

BYE clears the reservation in each of the connection managers in the session path. The use of the previously established Route header ensures each connection manager is traversed and the Call-ID uniquely identifies the session. A BYE message is only sent once the session has cleared at the MPLS layer. A BYE message can be sent by an admission manager associated with either endpoint.

The COPS Protocol

In a preferred embodiment of the present invention, the standard COPS protocol is used for communication between various elements in a communications network as described above. However, other messaging protocols which perform the same function may also be used. The way in which the standard COPS protocol is used in an embodiment of the present invention is now described.

Figure 7:
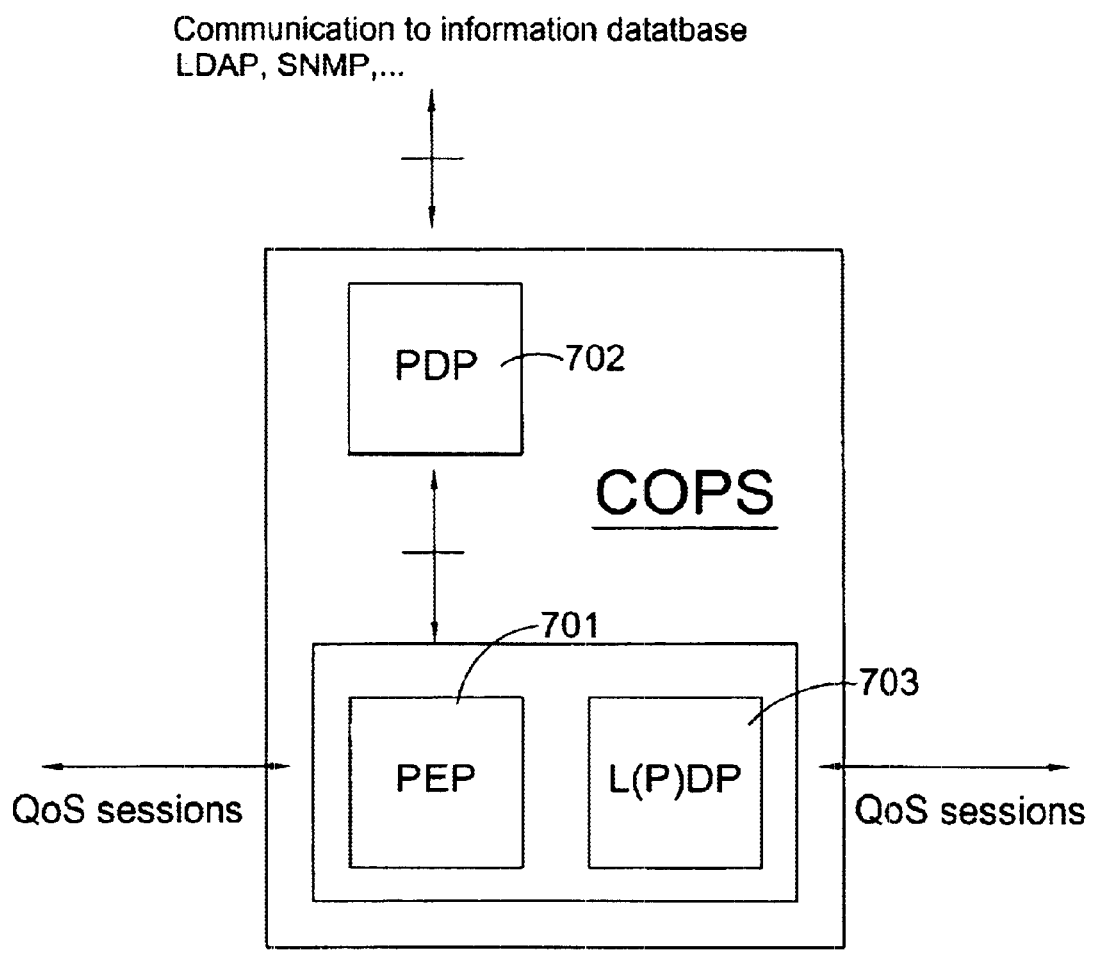
FIG. 7 illustrates a basic COPS model.

This protocol defines a client-server messaging mechanism that supports policy enforcement in a Quality of Service enabled network. The basic functional blocks used by the COPS protocol are shown in FIG. 7 and its basic operation can be described as follows. A new Quality of Service session request is received by a Policy Enforcement Point (PEP)—this request can be an RSVP path message or in a preferred embodiment of the present invention a CR-LDP message, although COPS is intended to be protocol independent. The PEP now queries a Policy Decision Point (PDP) as to whether it should allow this new session to be set-up. The PDP issues a response and the PEP implements this—either to deny the new session or to allow it to be set-up. A local policy decision point (LPDP) 703 is also included in the model as a method of getting a quick response to a query. The LPDP is only allowed to issue temporary decisions, pending a response from the PDP. In a preferred embodiment of the present invention an admission manager performs the functions of a PDP and an endpoint that of a PEP.

Figure 8:
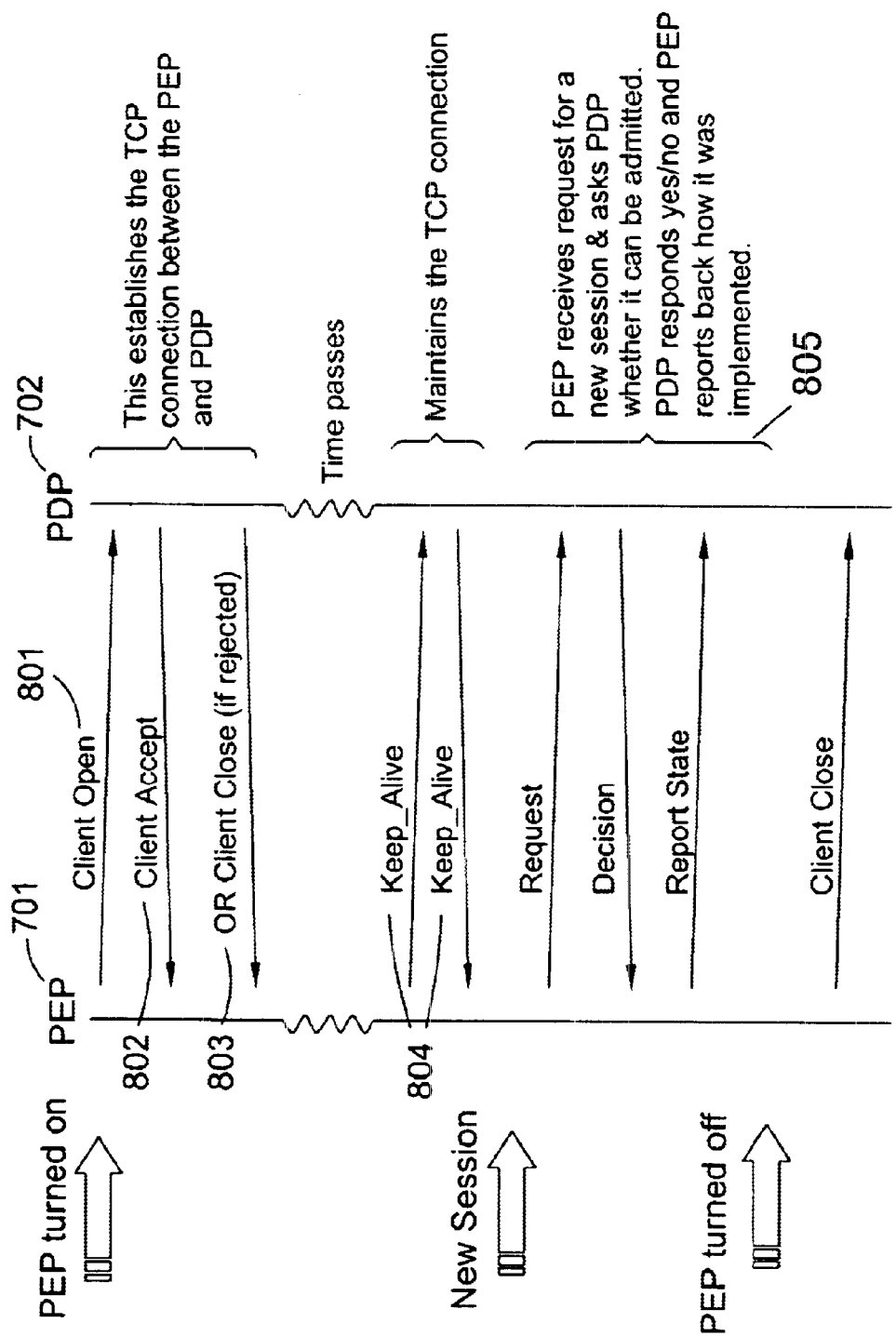
FIG. 8 is a flow diagram illustrating COPS messaging.

The COPS protocol uses a simple set of messages as illustrated in FIG. 8. Client Open 801, Client Accept 802, Client Close 803 and Keep Alive 804 are used to administer the connection from the PEP (Client) 701 to the PDP (Server) 702. New session requests are handled by a Request-Decision-Report State handshake 805. There is also a capability to synchronise the PDP and PEP with respect to the active sessions on the PEP.

Although COPS is a policy messaging protocol, it places no restriction on the type of policy information that it can exchange. In its role in the network described in this document, COPS is typically required to convey the information needed to establish a CR-LDP session over the interface between an endpoint and admission manager and between an admission manager and administrative server. In the former case, the endpoint issues a Request for a new session, with the Decision indicating failure or success and the parameters decided upon by SIP++ to use to set-up the session. In the Latter case, an admission manager requests a new tunnel in the MPLS core to be set-up by the Administrative Server. For example, this may be prompted by a Request from an endpoint.

In a preferred embodiment of the present invention, when COPS is used between a connection manager and an abstract node COPS messages carry a Call-ID as well as CR-LDP information. In this embodiment the protocol is used as a registration process, with all requests being granted under normal operation.

The CR-LDP Protocol

The CR-LDP protocol is now described for background information and in order to better illustrate the context of the present invention. However, it is not essential to use the CR-LDP protocol in the present invention.

The standard CR-LDP (Constraint-based Routing Label Distribution Protocol) protocol is an extension of the basic LDP protocol used to establish labelled flows in MPLS networks. It is designed to allow traffic engineering methods to be applied to an MPLS network such that specific paths can be established through a set of chosen nodes with a particular Quality of Service. CR-LDP is a messaging based protocol that uses TLV (Type Length Value) elements to encode data.

The standard LDP protocol is used to establish label mappings at a label switch router (LSR) between incoming and outgoing label switch paths (LSPs). A particular LSR is able to request from a peer a label that can be used to specify the route to that LSR. MPLS is thus able to transport IP packets across a network in a hop-by-hop manner by swapping labels at each node in the network.

Figure 9:
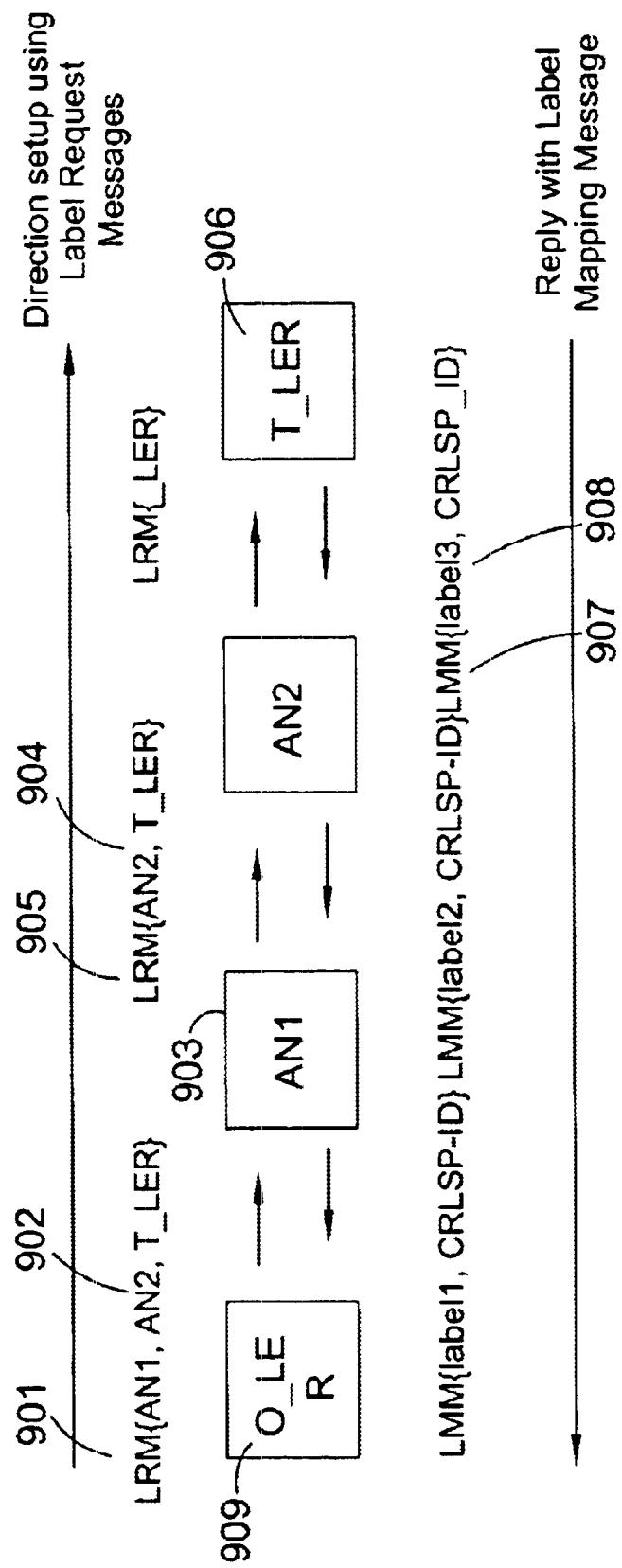
FIG. 9 is a flow diagram illustrating CR-LDP path set-up.

CR-LDP extends this to cover multiple hops in an MPLS network and its basic operation is illustrated in FIG. 9. A LSR issues a Label Request Message 901 which specifies the path 902 to be taken through the network and optionally the traffic characteristics, resource class, pinning options etc. for the path. The Label Request message is then sent to the first LSR 903 in the path. This can be an abstract node representation, though standard CR-LDP has no defined method for choosing which LSR to use if more than one reachable LSR is specified by an abstract node representation. By constraining the network, as described herein, by only allowing sessions to be established along predetermined paths this problem is effectively dealt with.

When the next LSR is reached, it identifies itself as being the next LSR in the path and removes itself from the path description 904. It then checks that there is another hop specified for the path and the modified message 905 is forwarded. This processing occurs until the final LSR 906 in the specified path is reached. At this point a Label Mapping Message 907 is returned back across the network through each of the nodes traversed. Each upstream LSR in turn indicates a label to the downstream LSR to use over that hop of the MPLS network. The Downstream LSR adds this value into its routing table 908 and issues a similar message. This process continues back to the originating LSR 909, at which point the LSP is completely set-up and ready for use.

Once established, the path behaves as though it is a single hop between two LSRs 909, 906, regardless of how many LSRs are actually traversed. It may also be used in subsequent CR-LDP paths as one of the hops.

Network Initialisation

The process of network initialisation is similar to the method used to establish a new link between Abstract Nodes. As noted above, although a link may exist between two groups of label switch routers (LSRs) which are grouped together to form an Abstract Node, the label switch path (LSP) established will be between two LSRs, one from each of the Abstract Nodes connected together.

The Administrative Server initialises the network link by link, sequentially establishing the high capacity LSPs to use over the network core. As soon as the link is active, its associated connection manager begins to advertise its presence to all other reachable nodes. As more links are established, the set of reachable nodes from each connection manager is increased until all links are present.

In FIG. 1 it can be seen that the endpoints 10, 11 do not have any high capacity links to their nearest abstract nodes 12, 14. Rather these connections are set-up on demand. The Administrative Server 35 therefore also initiates the forwarding of congestion information to an Endpoint 10, 11 from those Abstract Nodes which the endpoint 10, 11 is allowed to access as the first hop on a given path. The set of abstract nodes an endpoint can reach may be decided on a topological or bandwidth basis and are decided by the network provider. The Admission Manager 35 is then able to build up a picture of the paths available to it.

Should an Admission Manager 30, 31 need greater access to the MPLS network, it uses the COPS interface to the Administrative Server 35 to request access to another Abstract Node.

End to End Session Establishment

Figure 10:
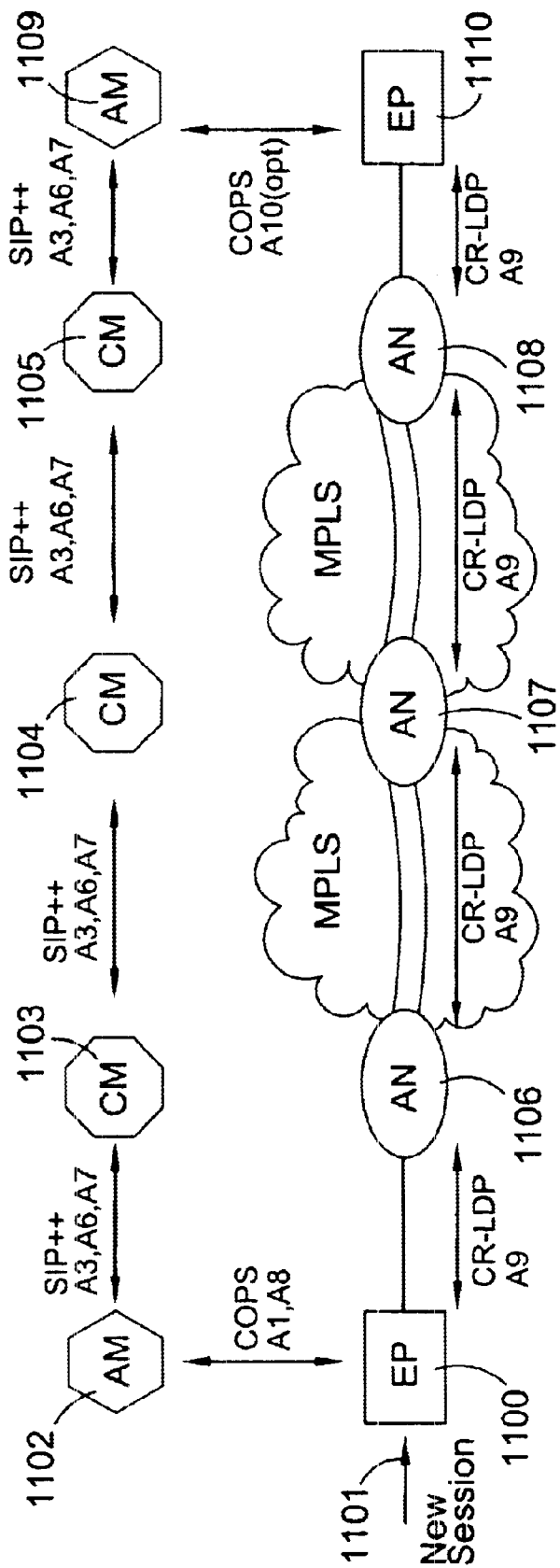
FIG. 10 is a flow diagram illustrating signalling during set-up of a communication session.

An example of the messaging used to establish a communication session across a communications network and provide a guaranteed quality of service is now described with reference to FIG. 10.

The first event is the arrival at an endpoint 1100 of a new session request 1101. There is no restriction on the type of request this can be, though it must obviously be one the endpoint 1100 understands. This causes the endpoint 1100 to send a COPS Request (labelled A1) to its associated Admission Manager 1102. Upon receipt of this Request, the Admission Manager 1102 determines the path or paths it will attempt to use to route the session to its destination. This may be either an explicit path or may use abstract nodes, depending on the amount of network topology information available to the Admission Manager 1102. Using its view of the network congestion and any associated route selection policies, the admission manager 1102 assigns a rank to each of the paths it has determined.

The Admission Manager 1102 then forms one INVITE message for each of the paths using the same Call-ID for each, but different Cseq values. Each INVITE message includes a path element, an associated rank and a traffic element in the message body. It will also include a session description message body. Each INVITE message is then sent A3 to each of the connection managers 1103, 1104, 1105 in turn that control Abstract Nodes 1106, 1107, 1108 in the specified path before finally reaching the destination admission manager 1109.

At each Connection Manager 1103, 1104, 1105 in the path, the path element of the INVITE message is interrogated for the next Abstract Node. The Connection Manager then determines if it has a label switch path (LSP) to that Abstract Node with sufficient free resource by comparison with the traffic element. If it has, it writes its SIP-URL into the Record-Route header of the INVITE message. The Connection Manager now adds a temporary soft-state reservation associated with the call-ID along the path and awaits confirmation. The Connection Manager may also choose to add a congestion message body to the message. The INVITE message is now forwarded to all Connection Managers whose Abstract Nodes were identified as suitable next hops using forking as described above. The final Connection Manager in the MPLS network implicitly performs an unforking operation by routing all INVITE messages to a single Admission Manager 1109. If the final Abstract Node 1108 is not described by an explicit address, an error response is generated.

If any of the traversed connection managers 1103, 1104, 1105 in the path have a next hop LSP which is currently too congested that connection manager responds with an 801/802 error response and ceases forwarding the INVITE message. The Record-Route header is used to route the response back. Any connection managers this error response traverses then update their congestion information accordingly. If the next hop LSP is not congested but unavailable for some other reason, an 803 response is sent and if the next abstract node in the path is simply unreachable from this connection manager, an 804 response is sent.

The destination Admission Manager 1109 eventually receives one or more INVITE messages. Upon receipt of the first INVITE message for a new session (i.e. an INVITE message that has an unrecognised Call-ID) a timer starts and all INVITE messages with the same Call-ID received within the time limit are processed. The Admission Manager 1109 then begins to form a 200 OK response. It uses the Record-Route headers of each incoming INVITE message to determine the path taken by that message. It ranks each of these paths and by convolution with the original ranking scores, it chooses a preferred path. Any suitable path weighting and cost algorithms may be used to help form the rank.

The destination admission manager 1109 now sends one 810 response per original INVITE message whose path was not used (i.e. one per CSeq value). It also then sends a 200 OK response for the chosen path, using the Record-Route header of the original to form the path element in the message body. The Record-Route is then also used to make a Route header. Finally, the Admission Manager 1109 stores the session description and Call ID before returning the 200 OK message A6. As this message traverses the connection managers 1105, 1104, 1103 listed in the Route header, it triggers the making of permanent reservations for the session at each traversed connection manager by up-dating the existing soft-state reservation.

As the 200 OK message traverses the connection managers, labels are consumed as described above in order to establish label mappings for the selected path.

On receipt of the 200 OK message, the originating Admission Manager 1102 closes the SIP++ negotiation process by sending an ACK message A7 back across the network using the chosen path as its route—gleaned from the received Route header. The receiving Admission Manager 1102 uses this ACK message to update its congestion information with the new session and as a confirmation of the path chosen. The originating Admission Manager 1102 also updates its path description for the session to reflect the chosen path.

Because the communication session has now been set up it is not necessary for the Endpoint 1100 to start a CR-LDP negotiation A9 using the path of explicit nodes 1106, 1107, 1108 and including the Call-ID as a vendor specific TLV. It is not necessary to use CR-LDP to establish a path through the specified LSRs and this reduces setup time significantly.

Bi-directional Communication Sessions

Figure 15:
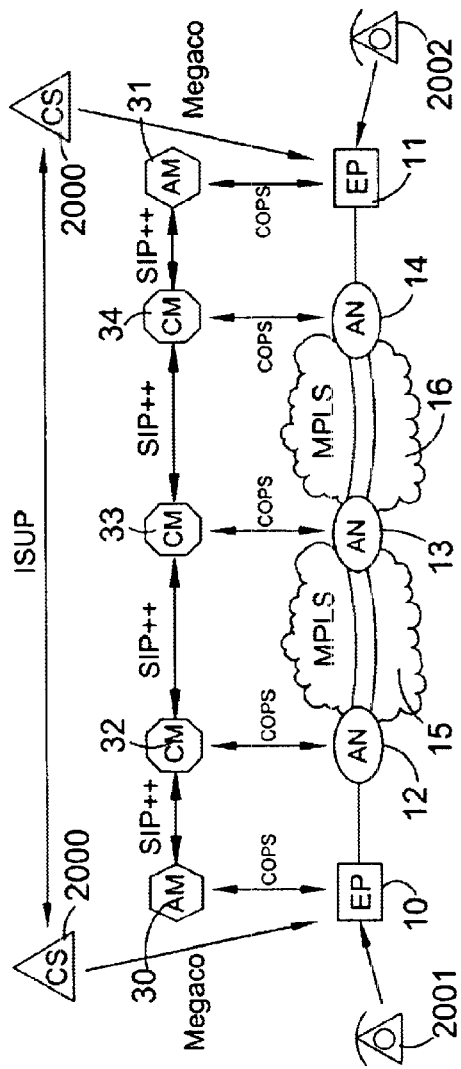
FIG. 15 is a schematic diagram of the communications network of FIG. 1 with call servers.

In one embodiment the communications network is an internet protocol communications network and is used to perform telephony operations. In this case a communications network similar to that shown in FIG. 15 is used, which incorporates call servers (CSs) 2000. The communications network of FIG. 15 is the same as the communications network of FIG. 1 with corresponding components labelled with the same reference numerals. FIG. 15 does not show an administrative server although this may be incorporated into the communications network as shown in FIG. 1. Terminals 2001, 2002 are also shown in FIG. 15, one terminal connected to each endpoint. Many terminals may be connected to each endpoint although this is not illustrated. The terminals 2001, 2002 are illustrated as telephone handsets, although any terminal suitable for accessing an internet protocol communications network may be used.

The call servers 2000 are connected together via an ISUP standard interface (which is part of the ITU signalling system no. 7 protocol) or any other suitable interface. Each endpoint 10, 11 is connected to a call server 2000, for example using the standard media gateway control protocol (MEGACO protocol) or any other suitable protocol.

The call servers handle call-setup signalling between user terminals 2001, 2002 as well as optional services such as call forwarding and are used to provision the path for the session. From the point of view of a call server, the only network elements are users and endpoints, connected by direct links.

Several different methods of establishing bi-directional communication sessions over the communications network of FIG. 15 are now described.

Use of ACK Message to Make Reservation

In a first method it is assumed that the bandwidth requirements for the forward and backward sessions are identical; that is, that the sessions are symmetrical. In the case of telephony over internet protocol communications networks this assumption is reasonable because for telephone conversations both parties typically require similar amounts of bandwidth.

Figure 16:
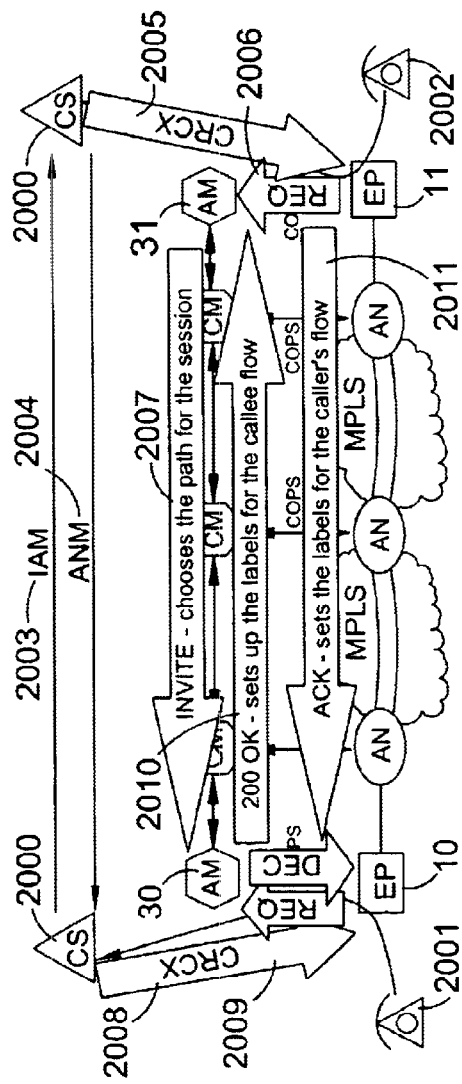
FIG. 16 is a schematic diagram of a first method of establishing a bi-directional communication session over the communications network of FIG. 15.

Referring to FIG. 16, this shows the communications network of FIG. 15 and illustrates a process of setting up a bi-directional communication session between telephony terminals 2001, 2002. A calling party uses terminal 2001 to begin a call by sending set-up information to the call server 2000 that is connected to the endpoint 10 associated with the terminal 2001. This call server 2000 is now referred to as the originating call server. Any suitable protocol may be used for communicating the set-up information from the terminal 2001 to the call server 2000, for example, the protocol used may vary depending on the type of terminal 2001 used.

The originating call server 2000 sends an initial address message (IAM) 2003 to the destination call server 2000, that is, the call server connected to the destination endpoint 11. The IAM would contain information about the address of the destination terminal 2002, but the originating call server 2000 replaces this address with the address of the destination endpoint 11. The IAM also contains information about the calling party's session characteristics, e.g. the type of calling party terminal 2001 being used.

When the destination call server 2000 receives the initial address message it forwards this to the destination terminal 2002. The destination terminal "decides" whether it is able to receive the call and responds accordingly to the destination call server. The response from the destination terminal 2002 contains information about that terminal's session needs e.g. the type of destination terminal 2002.

If the response received by the destination call server is positive, that call server issues a create connection (CRCX) message 2005 to the destination endpoint 11. This create connection message 2005 is formed according to the MEGACO protocol although any other suitable protocol may be used. The CRCX message instructs the destination endpoint 11 to form a connection between the calling terminal's endpoint 2001 and the called terminal 2002.

In order to form this connection part of the method described above using the SIP++ protocol is used. First, the called endpoint 11 forms a COPS request 2006 and sends this to its associated admission manager 31. One or more SIP++ INVITE messages are formed by that admission manager 31 in order to select a path for the session, which will have the required level of quality of service. As in the SIP++ method, described above, an INVITE message 2007 is propagated across the network to the calling party's admission manager 30 and temporary reservations (for tunnels on the reverse path) are made at each abstract node crossed. In addition to this identical temporary reservations are also made along the same path but in the opposite direction (for the forward path). These reservations are for the same bandwidth and quality of service parameters in both the forward and reverse directions. This enables bandwidth to be reserved along tunnels towards the caller and away from the caller at the same time.

In the meantime, the destination or called call server 2000 responds to the IAM by sending a message to the originating call server. This message comprises an ANM (Answer Message) 2004 which indicates that the called terminal 2002 is able to participate in the proposed new session.

When the ANM 2004 reaches the originating call server 2000, that call server sends a create connection message 2008 to the originating endpoint 10. This instructs the originating endpoint 10 to establish a connection between the calling terminal 2001 and the called endpoint 11. The called endpoint 11 then issues a COPS request 2009 to its associated admission manager 30 to initiate the SIP++ method.

In the first part of the method, in which the destination endpoint 11 begins to establish a one-way connection from the destination endpoint 11 to the originating endpoint 10, INVITE messages are sent from the destination admission manager to the originating admission manager. According to the SIP++ method described above, when the originating admission manager receives INVITE messages, it must select a path and issue a 200 OK response. However, in this case, the originating admission manager is arranged to wait before doing this. That is, the originating admission manager does not issue a 200 OK response, until it receives a COPS request from the originating endpoint 10 and INVITE messages from the destination admission manager.

When the admission manager has received both the COPS request 2009 and the INVITE message 2007 it matches these up. That is, the admission manager determines that these two messages are related to the same proposed two-way communication session. This is necessary, because other two-way communication sessions involving different terminals may be being set up simultaneously. The matching up process is done using information about the sessions contained in the COPS request 2009 and the INVITE messages 2007. Alternatively, a circuit identification code (CIC) is used. This CIC is included in the create connection messages 2005, 2008 and is written into the INVITE messages 2007 by the admission managers 30, 31 or endpoints 10, 11. The CIC is then passed to the calling party's admission manager 30 over the COPS interface using a suitable extension to the COPS protocol. The calling party's admission manager 30 is then able to match the COPS request 2009 and the INVITE message 2007 using the CIC.

Having correlated the COPS request 2009 with the INVITE message 2007, the originating admission manager 30 sends a 200 OK message 2010 back over the chosen path, in the same way as in the SIP++ method described above. As the 200 OK message is propagated along this path it causes labels to be consumed at each management node along the route as described above. In this way, label mappings are established at the abstract nodes for the reverse direction of the communication session.

When the destination admission manager 31 receives the 200 OK message the path from the called party to the calling party (i.e. the return path) is considered established. The destination admission manager 31 indicates this by sending a COPS decision message (not shown) to the destination endpoint 11. As in the SIP++ method described above, the destination admission manager 31 now sends an acknowledgement message (ACK) 2011 back to the originating admission manager.

The ACK message 2011 is sent back to the originating admission manager 30 along the same path as the original INVITE message 2007. As the ACK passes each connection manager 32, 33, 34 along that path, it causes the temporary reservations (along the reverse path) to be made permanent. Also, the ACK causes labels to be consumed at each management node along the reverse path and enables label mappings for the forward communication session to be established.

When the ACK message 2001 reaches the originating admission manager 30 the reverse path, from the called party to the calling party, is considered established. The two-way communication session is then ready for traffic. The originating admission manager 30 sends a COPS decision to the originating endpoint 10 to indicate this. When the originating endpoint 10 receives the COPS decision it informs the originating call server 2000 using a MEGACO message.

In this method, the reverse path is established before the forward path is established. This is particularly advantageous for telephony applications where ringing is applied at the called party terminal 2002. In such a situation, a backward path is required for the caller to hear the ringing.

This method involves establishing a forward path along one set of tunnels and a reverse path along corresponding tunnels but in the reverse direction. Both the forward and reverse paths take the same route and have the same bandwidth and quality of service. Using this method, the communications network is traversed by control messages only three times as illustrated in FIG. 16. This enables session setup times to be reduced. Also, this method is particularly suited to situations where the bandwidth required by the calling and called parties is similar.

Re-use of Path Information

Figure 17:
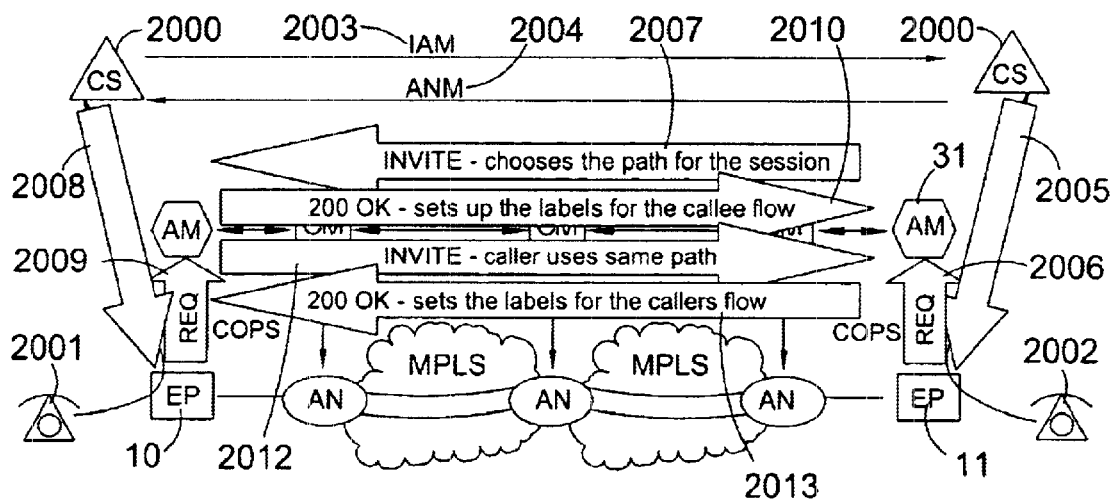
FIG. 17 is a schematic diagram of a second method of establishing a bi-directional communication session over the communications network of FIG. 15.

In a second method, the communications network is traversed by control messages four times. In this case, the ACK message is not used to set up the forward communication session. Instead a pair of INVITE and 200 OK messages are used for each of the forward and reverse paths as illustrated in FIG. 17. This means that the bandwidth on the forward and reverse paths is not necessarily equal.

The second method follows the first method to the point where the originating admission manager 30 receives INVITE messages 2007 from the destination admission manager 31. The originating admission manager 30 then selects one of these INVITE messages 2007 as in the SIP++ method described above. The path that the selected INVITE message took is stored in the originating admission manager 30. The originating admission manager then proceeds with a 200 OK message 2010 as described in the SIP++ method above. As this 200 OK message 2010 propagates through the network, label mappings are established for the reverse path.

In the meantime, the path stored by the originating admission manager 30 is used to form a new INVITE message 2012 which is issued by the originating admission manager to the destination admission manager 31. By "wildcarding" part of the stored path, the new INVITE message 2012 is arranged to select a route which does not necessarily correspond to that of the selected INVITE 2007. However, it is not essential to "wildcard" the stored path in this way, in which case, the forward and reverse paths correspond.

When the new INVITE message 2012 is received by the destination admission manager 31, a 200 OK response 2012 is formed and sent back to the originating admission manager 30 as described in the SIP++ method above. As the 200 OK response 2012 propagates from the destination admission manager to the originating admission manager, label mappings are established for the forward communication session, as described above.

Using this method, a route which is suited to the calling party's requirements and which makes best use of the available tunnels is chosen. That path is then assumed to be optimal for the reverse direction and used in the INVITE process for that reverse direction. For example, the bandwidth allocated to the called party and calling party can be different. Also, because the forward and reverse routes do not necessarily correspond there is no need to match up the forward and reverse paths as in the first method. This means that CICs are not essential although they may be used.

Identical Labels

A third method involves configuring the communications network such that the forward and reverse tunnels between two LSRs have the same numerical label. In this way, by controlling the allocation method of the session labels within these tunnels, it is possible to define the forward and reverse paths using a single label value which is the same at either end of the tunnel.

Figure 18:
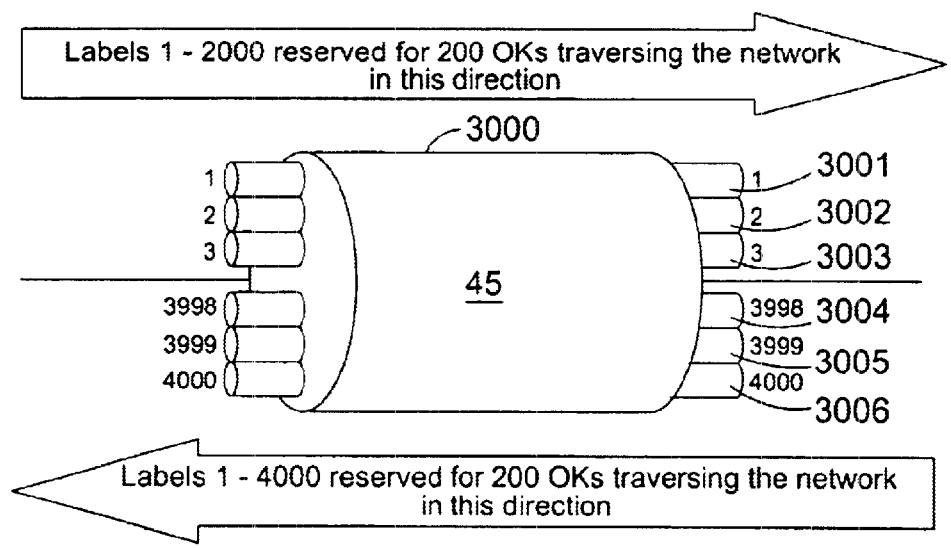
FIG. 18 is a schematic diagram of a third method of establishing a bi-directional communication session over the communications network of FIG. 15.

Referring to FIG. 18, a tunnel is shown 3000, which comprises several session labels 3001 to 3006. The session labels are uni-directional. Between two neighbouring label switch routers, two such tunnels 3000 exist and have identical session labels in each direction.

Using this method the forward and reverse paths correspond and have the same bandwidth.

Using this method, INVITE messages are sent from the originating admission manager to the destination admission manager following the SIP++ method described above. The destination admission manager selects one of these INVITE messages and sends a 200 OK response back along its path. As this 200 OK response propagates over the communications network, labels are consumed and label mappings established for both the forward and the reverse communications sessions simultaneously. The process of consuming labels and establishing the label mappings may be carried out using a COPS messaging process or an LDP messaging process in a similar way to the method described above.

Figure 19:
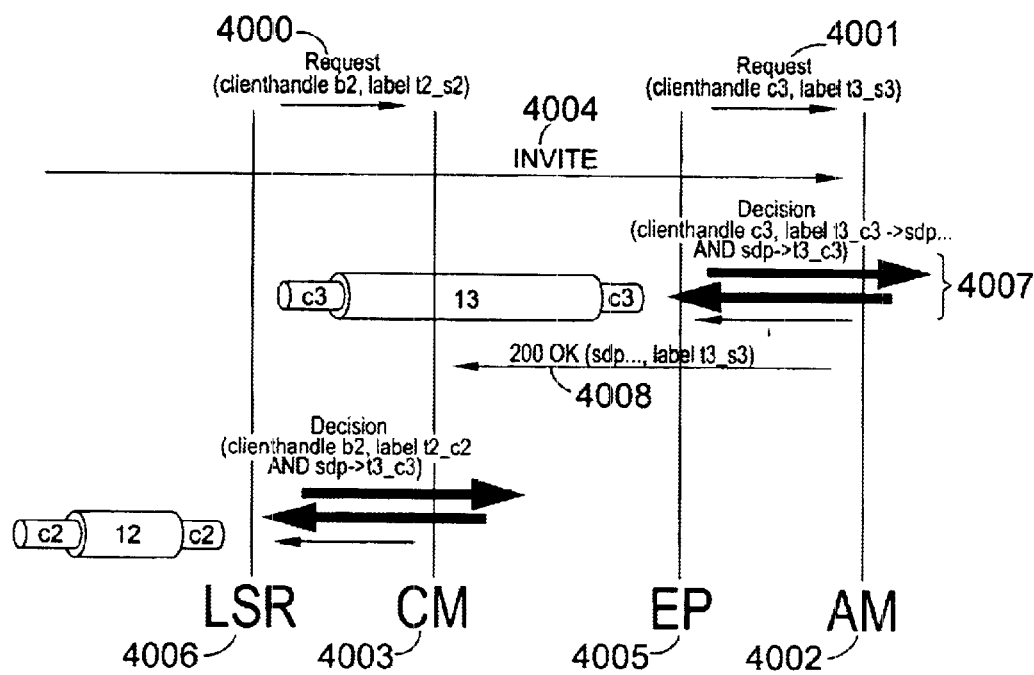
FIG. 19 is a schematic diagram of a process for establishing a mapping using the COPS protocol.

FIG. 19 illustrates use of a COPS messaging process to consume labels and establish label mappings for the forward and reverse communication sessions simultaneously. FIG. 19 shows the situation where the tunnels have been registered and labels cached as described above. Management nodes and physical nodes are represented as vertical lines in a similar way as for FIGS. 13 and 14. The forward direction is from left to right in FIG. 19.

One cached label 4000, 4001 is shown for each management node 4002, 4003, but this is for illustrative purposes only. A plurality of labels may be cached at each management node.

An INVITE message 4004 is illustrated as being received at the destination admission manager 4002. The destination admission manager then consumes a label, which in this case is the only label 4001 cached at that admission manager. The destination admission manager informs its associated endpoint 4005 of the consumed label 4001 in a decision message 4007. The decision message 4007 contains information about the consumed label, in this case, label t3-s3, and also label to session mapping information for the forward direction, in this case, label t3__s3→sdp. In this case, because the communications network has been specially configured such that the forward and reverse paths between two LSRs are defined by a single label, the devision message 4007 also contains label to session mapping information for the reverse direction, in this case, label sdp→t3__s3.

As well as this the decision message 1410 contains client handle information, in this case, clienthandle c3, which enables the endpoint to cross-check the indicated label.

The destination admission manager 4002 now sends a 200 OK response 4008 and adds to this the chosen label, in this case, label t3__s3. When the first connection manager 4003 receives the 200 OK response 4008, it determines the next connection manager in the path and consumes an appropriate label, in this case label 4000. The first connection manager 4003 then indicates this consumed label 4000 to its associated label switch router 4006 together with information about the previously consumed label 4001. The label switch router 4006 then "knows" to make a mapping between label 4000 and label 4001 for the forward direction. Also, the label switch router 4006 "knows" to make a mapping between label 4001 and label 4000 in the reverse direction. In FIG. 19, this means that LSR 4006 sets up a label mapping from t2__s2 to t3__s3 in the forward direction and from t3__s3 to t2__s2 in the reverse direction.

The connection manager 4003 then forwards the 200 OK message to the next connection manager and incorporates the consumed label 4000 into this 200 OK message. The process then repeats until the 200 OK message reaches the originating admission manager. At this stage a complete bi-directional communication session is established.

Full Message Proxy

A fourth method is related to the first method in that an ACK message is used to carry label information to set up the label mappings. In the first method, the communications network is traversed three times by control messages to set up a two-way communication session. These three traversals take place in series, first the INVITE message, then the 200 OK message and then the ACK message. The number of times the network is traversed in this way affects the set-up time for the communications session. In the fourth method, the process of propagating the 200 OK message and the ACK message are concurrent rather than being carried out in series which reduces set-up time in some circumstances. Also, as in the first method, the forward and reverse paths are identical and have the same bandwidth and quality of service parameters.

Figure 20:
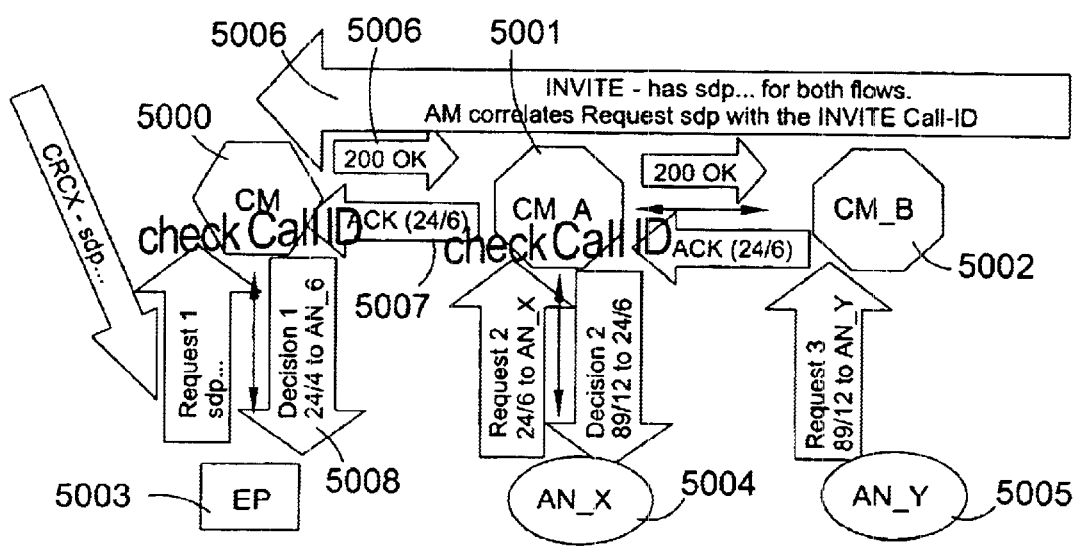
FIG. 20 is a schematic diagram of a fourth method of establishing a bi-directional communication session over the communications network of FIG. 15.

Referring to FIG. 20, the fourth method of setting up a two-way communication session is illustrated. The situation in FIG. 20 involves the calling party being on the right hand side of the figure and the destination or called party being connected to an endpoint 5003 at the left hand side of the figure. An admission manager (not shown) associated with the calling party has issued an INVITE message 5006 which has reached the destination admission manager 5000 as shown. The destination admission manager 5000 then issues a 200 OK response 5006 and adds to this a label that it has consumed for the endpoint 5003. A first connection manager 5001 receives the 200 OK response 5006 and uses the label in that 200 OK response to form a label mapping to the endpoint (for use in future by messages travelling in the forward direction, from the calling party to the called party).

The label switch router 5004 associated with the first connection manager 5001 advertised labels for use on tunnels connected to itself as described above. These labels are cached at the appropriate management nodes, also as described above. This means that the label switch router 5004 also advertised labels for use on tunnels in the reverse direction, from that LSR to the endpoint 5003. The first connection manager 5001 is arranged to consume one such label for the reverse direction and add this to an ACK message 5007 that it sends back towards the destination admission manager 5000. The ACK message 5007 also contains a call identifier.

When the destination admission manager 5000 receives the ACK message 5007 it checks the call identifier and uses the label information to form a label mapping for the reverse direction.

Meanwhile, the 200 OK message at the first connection manager 5001, consumes a label and carries this on to the next LSR in the path which is a second connection manager 5002. In this way the label mapping for the forward path is set up by the 200 OK message. At the same time, ACK messages sent in the forward direction, as illustrated in FIG. 20 enable a label mapping for the reverse direction to be set up. In this way the method involves a series of separate single hops each establishing a connection using the same set of session parameters.

A range of applications are within the scope of the invention. These include situations in which it is required to establish a bi-directional communication session over a communications network. For example, transmission of real time internet protocol messages over an MPLS communications network and use of internet protocol communications networks for guaranteed quality of service telephony sessions.

What is claimed is:

1. A method of establishing a bi-directional communication session between a first endpoint and a second endpoint in a communications network, said method comprising the steps of:
   (i) sending a communication from said second endpoint to said first endpoint to determine a path between said second and said first endpoints;
   (ii) sending a first message along said path in order to set up a first label mapping along said path, for use over said path in a forward direction; and concurrently sending a second message along said path in order to set up a second label mapping along said path, for use over said path in a reverse direction.

2. A method as claimed in claim 1 wherein said first and second messages are sent along said path in opposite directions.

3. A method as claimed in claim 1 wherein said communication session is provided with a specified level of quality of service.

4. A method as claimed in claim 1 wherein said communications network is an internet protocol communications network.

5. A method as claimed in claim 1 wherein said communication session is suitable for provision of telephony services.

6. A method as claimed in claim 1 wherein said communications network comprises a plurality of nodes interconnected by links and wherein said communications network is configured such that a plurality of said links are of a specified capacity.

7. A method as claimed in claim 6 wherein nodes which are connected to a link of a specified capacity are arranged to advertise information about that link.

8. A method as claimed in claim 7 wherein said information comprises the source, destination and capacity of the link.

9. A method as claimed in claim 8 wherein said information comprises a label for use by a message protocol in order to traverse that link.

10. A method of establishing a bi-directional communication session between a first endpoint and a second endpoint in a communications network, said method comprising the steps of:
    (i) sending a communication from said first endpoint to said second endpoint to determine a path between said endpoints;
    (ii) sending a message along said path in order to set up a first label mapping along said path, for use over said path in a forward direction; and also concurrently to set up a second label mapping along said path, for use over said path in a reverse direction.

11. A method as claimed in claim 10 wherein said communications network comprises nodes interconnected by links, and wherein said communications network is configured such that at least some of said communications links are assigned a label for a forward direction along that link and the same label for a reverse direction along that link.

12. A method as claimed in claim 10 wherein said communication session is provided with a specified level of quality of service.

13. A method as claimed in claim 10 wherein said communications network is an internet protocol communications network.

14. A method as claimed in claim 13 wherein said communication session is suitable for provision of telephony services.

15. A method as claimed in claim 10 wherein said communications network comprises a plurality of nodes interconnected by links and wherein said communications network is configured such that a plurality of said links are of a specified capacity.

16. A method as claimed in claim 15 wherein nodes which are connected to a link of a specified capacity are arranged to advertise information about that link.

17. A method as claimed in claim 16 wherein said information comprises the source, destination and capacity of the link.

18. A method as claimed in claim 16 wherein said information comprises a label for use by a message protocol in order to traverse that link.

19. A method of establishing a bi-directional communication session between a first endpoint and a second endpoint in a communications network, said method comprising the steps of:
    (i) setting up first label mappings between the endpoints to establish a first uni-directional communication session between the endpoints in a forward direction;
    (ii) setting up second label mappings between the endpoints to establish a second uni-directional communication session between the endpoints in a reverse direction; and
    wherein said steps (i) and (ii) of establishing uni-directional communication sessions take place substantially concurrently on the same path.

20. A method as claimed in claim 19 wherein said communication session is provided with a specified level of quality of service.

21. A method as claimed in claim 19 wherein said communications network is an internet protocol communications network.

22. A method as claimed in claim 21 wherein said communication session is suitable for provision of telephony services.

23. A method as claimed in claim 19 wherein said communications network comprises a plurality of nodes interconnected by links and wherein said communications network is configured such that a plurality of said links are of a specified capacity.

24. A method as claimed in claim 24 wherein said communications network includes a plurality of nodes interconnected by links which form a physical layer of said communications network and wherein nodes in said physical layer which are connected to a link of a specified capacity are arranged to advertise information about that link.

25. A method as claimed in claim 24 wherein said information comprises the source, destination and capacity of the link.

26. A method as claimed in claim 24 wherein said information comprises a label for use by a message protocol in order to traverse that link.

27. A communications network comprising at least two endpoints between which it is desired to establish a bi-directional communication session, said communications network comprising:
   (i) a determiner arranged to determine a path between said second and said first endpoints by sending a communication from said second endpoint to said first endpoint;
   (ii) a processor arranged to send a first message along said path in order to set up a first label mapping along said path, for use over said path in a forward direction; and
   (iii) a processor arranged to send a second message along said path in order to set up a second label mapping along said path concurrently with the first label mapping, for use over said path in a reverse direction.

28. A communications network as claimed in claim 27 which is an internet protocol communications network.

29. A communications network as claimed in claim 27 which is an MPLS communications network.

30. A communications network comprising at least two endpoints between which it is desired to establish a bi-directional communication session, said communications network comprising:
   (i) a determiner arranged to determine a path between said endpoints by sending a communication from said first endpoint to said second endpoint; and
   (ii) a processor arranged to send a message along said path in order to set up a first label mapping along said path, for use over said path in a forward direction; and also concurrently to set up a second label mapping along said path, for use over said path in a reverse direction.

31. A communications network as claimed in claim 30 which is an internet protocol communications network.

32. A communications network as claimed in claim 30 which is an MPLS communications network.

33. A communications network comprising at least two endpoints between which it is desired to establish a bi-directional communication session, said communications network comprising:
   (i) a processor arranged to set up first label mappings between the endpoints establish a first uni-directional communication session between the endpoints in a forward direction; and
   (ii) a second processor arranged to set up second label mappings between the endpoints establish a second uni-directional communication session between the endpoints in a reverse direction; and wherein said steps (i) and (ii) of establishing uni-directional communication sessions take place substantially concurrently on the same path.

34. A computer program stored on a computer readable medium said computer program being arranged to control said communications network such that:
   (i) a communication is sent from said second endpoint to said first endpoint to determine a path between said second and said first endpoints;
   (ii) a first message is sent along said path in order to set up a first label mapping along said path, for use over said path in a forward direction; and concurrently, a second message is sent along said path in order to set up a second label mapping along said path, for use over said path in a reverse direction.

35. A computer program stored on a computer readable medium said computer program being arranged to control said communications network such that:
   (i) first label mappings are set up between the endpoints to establish first uni-directional communication session between the endpoints in a forward direction;
   (ii) second label mappings are set up between the endpoints to establish a second uni-directional communication session between the endpoints in a reverse direction;

and wherein said steps (i) and (ii) of establishing uni-directional communication sessions take place substantially concurrently on the same path.

* * * * *